United States Patent
Liu

(10) Patent No.: US 10,509,926 B2
(45) Date of Patent: Dec. 17, 2019

(54) TERNARY ENCODING MAGNETIC STRIPE DATA TRANSMITTER, SYSTEM, AND METHOD

(71) Applicant: Samsung Electronics Co., Ltd., Suwon-si, Gyeonggi-do (KR)

(72) Inventor: Zhujie (Luke) Liu, Lexington, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/800,553

(22) Filed: Nov. 1, 2017

(65) Prior Publication Data
US 2019/0130138 A1    May 2, 2019

(51) Int. Cl.
*G06K 19/06* (2006.01)
*G06K 7/08* (2006.01)

(52) U.S. Cl.
CPC ........ *G06K 7/087* (2013.01); *G06K 19/06206* (2013.01)

(58) Field of Classification Search
CPC ............ G06K 7/00; G06K 7/08; G06K 19/00; G06K 19/06187; G06K 19/06196; G06K 19/06206; G06K 19/12
See application file for complete search history.

(56) References Cited

U.S. PATENT DOCUMENTS

| | | | | |
|---|---|---|---|---|
| 8,590,796 B1* | 11/2013 | Cloutier | ........... | G06K 19/06196 235/488 |
| 8,727,219 B1* | 5/2014 | Mullen | ............ | G06K 19/06196 235/380 |
| 2008/0040284 A1* | 2/2008 | Hazel | ..................... | G06F 21/72 705/64 |
| 2009/0159663 A1* | 6/2009 | Mullen | ............ | G06K 19/06206 235/379 |
| 2009/0159667 A1* | 6/2009 | Mullen | ............ | G06K 19/06206 235/380 |
| 2010/0270373 A1* | 10/2010 | Poidomani | ......... | G06K 19/0702 235/380 |
| 2012/0039469 A1* | 2/2012 | Mueller | ................ | G06Q 20/12 380/252 |
| 2016/0346671 A1* | 12/2016 | Jarchafjian | ......... | A63F 3/00694 |

* cited by examiner

*Primary Examiner* — Thien M Le
*Assistant Examiner* — April A Taylor
(74) *Attorney, Agent, or Firm* — Jefferson IP Law, LLP

(57) ABSTRACT

A contactless payment device and method streams a sequence of magnetic-field pulses directly to two or three magnetic-stripe read heads of a point-of-sale terminal. Gaps between magnetic-field pulses are included in the signal to promote differentiation between different portions of the signal by different receiver channels in the point-of-sale terminal, and to encode additional information.

20 Claims, 18 Drawing Sheets

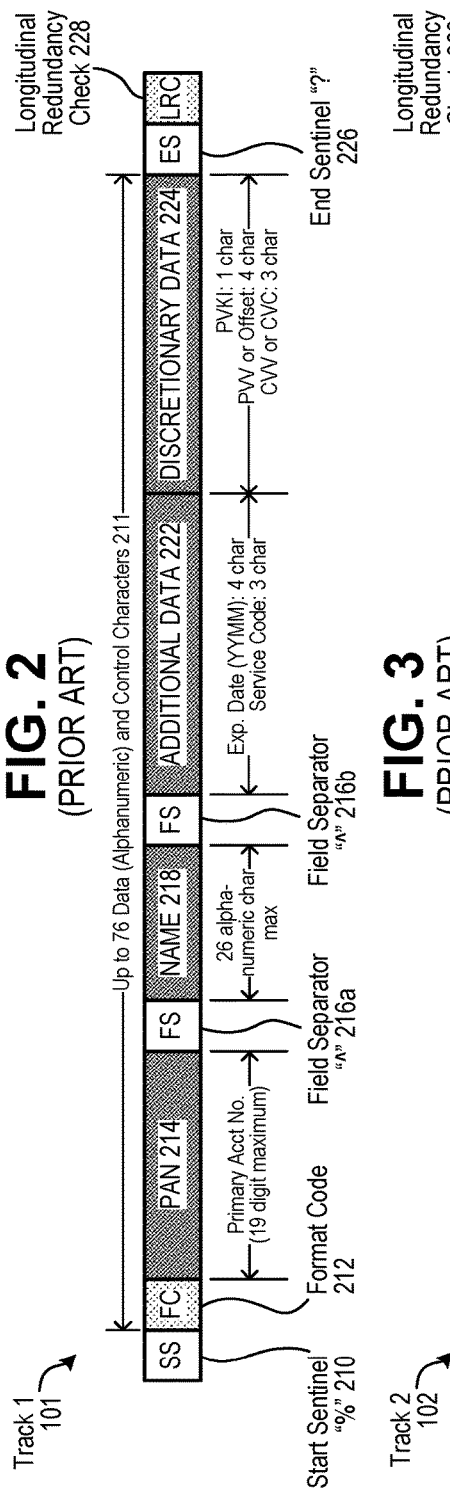
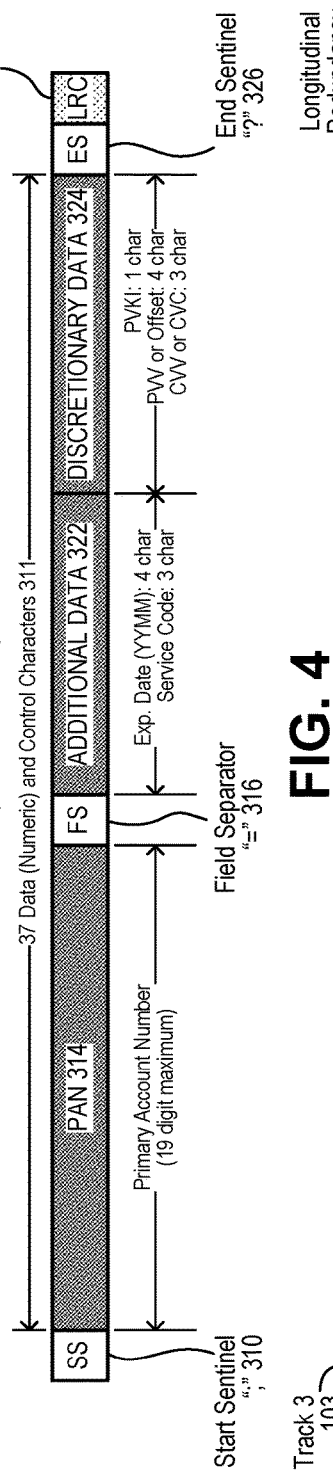
FIG. 2 (PRIOR ART)
FIG. 3 (PRIOR ART)
FIG. 4 (PRIOR ART)

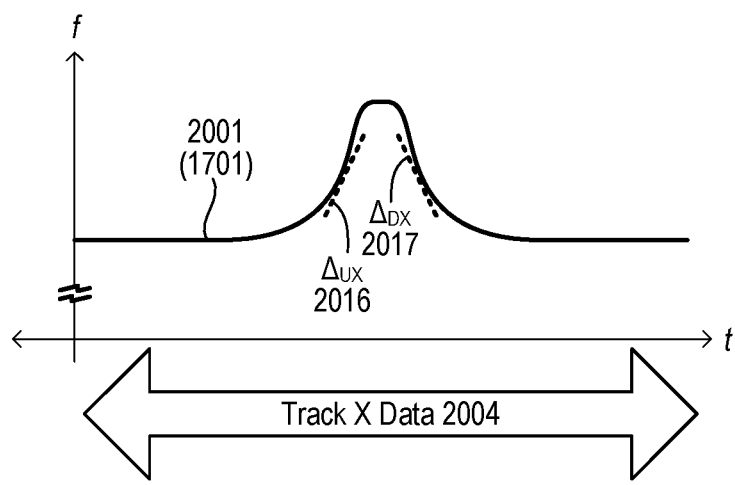
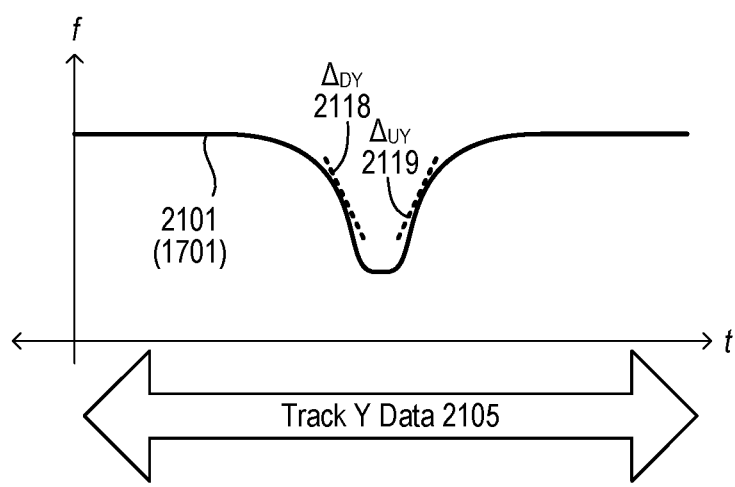

TERNARY ENCODING MAGNETIC STRIPE DATA TRANSMITTER, SYSTEM, AND METHOD

FIELD

The present invention relates to apparatus, systems, and methods for encoding, transmitting, and validating information ordinarily stored on a magnetic stripe card.

BACKGROUND

Reading data from the magnetic stripes on credit and debit cards has primarily been performed by swiping the magnetic stripe against reader heads of a magnetic stripe reader (MSR). The data contained in the magnetic stripe is encoded in discrete tracks (channels) whose content and/or format are different. The movement of the card causes the magnetic fields produced by magnetic domains contained in the stripe to induce voltages in the MSR's read heads. A magnetic domain is a region within a magnetic material in which magnetization is in a uniform direction. In the track of a magnetic stripe card, each domain is magnetized in a direction that is parallel to the length of the magnetic stripe.

An MSR is capable of reading the data from one or more tracks/channels, and includes a read head for each channel that will be read. The MSR reads the data encoded in a track by converting a sequence of voltages induced in a channel's read head into a series of binary bits. The tracks are spaced close to each other, so each read head is precisely lined up with a corresponding track of the magnetic stripe.

The tracks of a typical magnetic stripe card 100 are described with reference to FIG. 1. As illustrated, there are three tracks of data (labeled as 101, 102, and 103), which are encoded in the magnetic stripe 11. On a standard credit/debit card, the magnetic stripe is located 0.223 inches (5.66 mm) from the edge of the card. A width 111 of each of the three tracks is 0.110 inches (2.79 mm). Each track conforms to a different encoding standard 112. The standard 112 corresponding to a track specifies the respective track's recording density 113 and character configuration 114 (in terms of bits-per-character and character type). Each track may contain a different number of characters (Information Content 115), with the maximum number of characters in each track specified in the corresponding standard 112.

The format of Track 1 101 was specified in a standard 112a developed by the International Air Transaction Association (IATA) for the automation of airline ticketing or other transactions where a reservation database is accessed. Track 1 101 typically has a recording density 113a of 210 bits per inch (8.27 bits per mm). The character configuration 114a of Track 1 101 is 7-bit alphanumeric characters. The information content 115a (including control characters) is limited to a maximum of 79 characters.

The format of Track 2 102 was specified in a standard 112b developed by the American Bankers Association (ABA) for the automation of financial transactions. Track 2 information is also used by most systems that require an identification number and other control information. Track 2 102 typically has a recording density 113b of 75 bits per inch (2.95 bits per mm). The character configuration 114b of Track 2 102 is 5-bit numeric characters (plus 5-bit control characters). The information content 115b (including control characters) is limited to a maximum of 40 characters.

The format of Track 3 103 is specified by a standard 112c developed by the Thrift-Savings industry. Track 3 103 typically has a recording density 113c of 210 bits per inch (8.27 bits per mm). The character configuration 114c of Track 3 103 is 5-bit numeric characters (plus 5-bit control characters). The information content 115c (including control characters) is limited to a maximum of 107 characters. Track 3 103 is unused by many of the major worldwide financial networks, and sometimes is not even physically present on a card, allowing for a narrower magnetic stripe. However, Track 3 103 is used in certain places, such as China, typically as an alternative to Track 2 102.

FIG. 2 illustrates an example data structure stored on Track 1 101 of a payment card. Track 101 may include the following data fields (in this order):

SS|FC|PAN|FS|Name|FS|Additional Data|Discretionary Data|ES|LRC.

The data structure of Track 1 comprises a one-character Start Sentinel (SS) 210 and a one-character End Sentinel 226, with up to 76 data characters (211) in-between. The Start Sentinel (SS) 210 and the End Sentinel 226 are "control" characters specified by the track standard 112a. The data characters 211 may also include control characters, such as characters that delimit between fields. An example of a control character included within the data sequence 211 is a Field Separator 216.

The one-character Start Sentinel (SS) 210 indicates the beginning of the data structure and consists of a "%" (percent sign) character. A one-character Format Code (FC) 212 is an alphabetic-only (A-to-Z) character and indicates the card type. A Primary Account Number (PAN) field 214 comprises the credit/debit card number, is always numerical, and contains up to 19 digits. The one-character Field Separators (FS) 216a and 216b delimit different fields and each consists of a "^" (caret) character. A Name field 218 corresponds to the name of a particular card account holder, and consists of two-to-twenty-six character alphanumeric characters. A surname separator consisting of a "/" (forward slash) character may be used to separate the card account holder's surname from their first name. If the Name field 218 is not used, it may be replaced with one upper case letter or a null (such as a blank-space character or zero) followed by a "/" (forward slash) character.

An Additional Data field 222 typically includes up to seven numbers. Four of the numbers may indicate an expiration date of the card in a YYMM format. If the date field information is not included, another field separator 216 may be included instead. Three of the numbers of the Additional Data field 222 may be a three-character service code relating to the types of charges that may be accepted. If the service code field is omitted, another field separator 216 may be included instead.

A Discretionary Data field 224 includes data used for card verification information. Examples of the discretionary data include a one-character PIN Verification Key Indicator (PVKI), a four-character PIN Verification Value (PVV) or Offset, and a three-character Card Verification Value (CVV) or Card Validation Code (CVC). The one-character End Sentinel (ES) 226 indicates an end of the data structure and consists of a "?" (question mark) character. A one-character Longitude Redundancy Check (LRC) 228 is included at the end of the data structure to provide verification that Track 1 101 was accurately read by the MSR.

FIG. 3 illustrates an example data structure stored on Track 2 102. Track 2 102 may include the following data fields (in this order):

SS|PAN|FS|Additional Data|Discretionary Data|ES|LRC.

The data structure of Track 2 comprises a one-character Start Sentinel (SS) 310 and a one-character End Sentinel 326, with up to 37 data characters (311) in-between. The Start Sentinel (SS) 310 and the End Sentinel 326 are "control" characters specified by the track standard 112b. The data characters 311 may also include control characters, such as characters that delimit between fields. An example of a control character included within the data sequence 311 is a Field Separator 316.

The one-character Start Sentinel (SS) 310 indicates the beginning of the data structure and consists of a ";" (semicolon) character. A Primary Account Number (PAN) field 314 is similar to the PAN 214 in Track 1. The PAN field 314 comprises the credit/debit card number, is always numerical, and contains up to 19 digits. The one-character Field Separator (FS) 316 consists of a "=" (equals sign) character. The Additional Data field 322 is similar to the Additional Data field 222 in Track 1 101, and may include the expiration date field and the service code field, with a Field Separator (FS) 316 substituted if a field is omitted. A Discretionary Data field 324 includes data like that described in connection with the Discretionary Data field 224 in Track 1 101. The one-character End Sentinel (ES) 326 indicates an end of the data structure and consists of a "?" (question mark) character. A one-character Longitude Redundancy Check (LRC) 328 is included at the end of the data structure to provide verification that Track 2 102 was accurately read by the MSR.

FIG. 4 illustrates an example data structure stored on Track 3 103. Track 3 103 may include the following data fields (in this order):

SS|FC|PAN|FS|Use and Security Data|Additional Data|ES|LRC.

The data structure of Track 3 comprises a one-character Start Sentinel (SS) 410 and a one-character End Sentinel 426, with up to 104 data characters (411) in-between. The Start Sentinel (SS) 410 and the End Sentinel 426 are "control" characters specified by the track standard 112c. The data characters 411 may also include control characters, such as characters that delimit between fields. An example of a control character included within the data sequence 411 is a Field Separator 416.

The one-character Start Sentinel (SS) 410 indicates the beginning of the data structure and consists of a ";" (semicolon) character. A two-digit Format Code (FC) 412 is numeric-only (00-to-99). A Primary Account Number (PAN) field 414 is similar to the PAN fields 214 and 314, containing up to 19 digits. The one-character Field Separator (FS) 416 consists of a "=" (equals sign) character. A Use and Security Data field 420 includes a variety of sub-fields related to currency types, payment limits, payment cycles, and card security. Sub-fields that are omitted may be replaced with a Field Separator (FS) 416.

An Additional Data field 422 may include fields indicating optional subsidiary account numbers, a digit relay marker field, a six digit crypto check field containing a validation value used to verify the integrity of Track 3 content, and various additional data. Field Separators (FS) 416 may be placed between subfields. Field Separators 416 may also be substituted for omitted sub-fields, such as when the crypto-check data field is omitted. The one-character End Sentinel (ES) 426 indicates an end of the data structure and consists of a "?" (question mark) character. A one-character Longitude Redundancy Check (LRC) 428 is included at the end of the data structure to provide verification that Track 3 103 was accurately read by the MSR.

FIG. 5 illustrates a typical structural arrangement of MSR read heads 500, including a Track 1 read head 501, a Track 2 read head 502, and a Track 3 read head 503. Double-head and triple-head arrangements are commonly used in Point-Of-Sale (POS) terminals to read credit and debit cards. In operation, the stripe 11 is inserted into a slot in a housing of the POS terminal (not illustrated) and is swiped in a direction parallel to the longitudinal axis 12 against the read heads 501/502/503 of an MSR component of the POS terminal.

The magnetic data in each track 101/102/103 is encoded using a Differential Manchester encoding format defined by the ISO/IEC-7811 standard. This format is known as "F2F" (frequency/double frequency), although it is sometimes referred to as "Aiken Biphase." The F2F encoding format allows the serial data stored on a track to be self-clocking. As such, the signals from the read heads can be decoded without the need for a separate "clock" signal for synchronization, allowing the MSR to differentiate between individual bits encoded in the signal. The rate at which the individual bits are transmitted and received is commonly referred to as the "baud" rate (unit symbol "Bd"), with one baud equal to one bit-per-second.

In each track of a magnetic stripe card 100, bits are encoded serially on the magnetic stripe 11 using a series of magnetic flux transitions, with the magnetic domains on opposing sides of each transition having an opposite orientation of polarity relative to the other. Modeled as bar magnets, the domains alternate between south-to-north and north-to-south orientations, aligned in the direction that the card 100 will be swiped (that is, in a direction parallel to axis 12, as illustrated in FIG. 1). Each bit of data on a track has a fixed physical length on the magnetic stripe 11. Flux transitions are located at the edge of each "0" and "1" bit, and also in the center of each "1" bit.

As the magnetic stripe 11 passes by the read heads 501/502/503, the reversal of magnetic polarity at the transition from one domain to the next causes an electric current to be induced in the adjacent read head. The first read head 501 is used to read the data stored in Track 1 101, the second read head 502 is used to read the data stored in Track 2 102, and the third read head 503 is used to read the data stored in Track 3 103. Software typically installed in the POS terminal processes the data received from the MSR. Depending upon the depth of the slot and the spacing between the heads 501/502/503, MSRs can be configured to read all three tracks or particular track combinations, such as reading Track 1 101 and Track 2 102, or reading Track 1 101 and Track 3 103, or reading Track 2 102 and Track 3 103. In POS terminals configured to read only two tracks, it is unnecessary for the MSR to include the read head and associated circuitry needed to read the unread track.

As a track 101/102/103 passes a respective magnetic read head 501/502/503, the flux transitions for that channel are converted into a series of alternating positive and negative pulses in the MSR. The transitions where the "north" poles of two domains meet will produce a positive pulse in the corresponding read head. Likewise, the transitions where two "south" poles meet will produce a negative pulse in the corresponding read head.

A binary 0 is encoded using a single magnetic domain, while a binary 1 is encoded using two smaller magnetic domains. After determining which flux transitions represent the edges of a bit, ones and zeros can be differentiated by the presence or absence of a transition in the center of the bit. The polarity of the transitions is arbitrary, since only the relative space between the transitions implies a binary 1 or a binary 0. Spatially, each of the two magnetic domains used to encode a binary 1 has one-half the physical length (in the direction the card is swiped) of a magnetic domain used to encode a binary 0, such that the physical space required to represent a binary 0 and a binary 1 in a track is the same.

Although the spacing of the bits in each respective track 101/102/103 is uniform, MSRs can tolerate variation in baud rate. That tolerance is built into the hardware and software of MSRs to accommodate variations in the speed at which a stripe 11 may be swiped across the read heads 501/502/503. Different people may swipe cards 100 at different speeds, and the speed of a swipe may vary over the duration of a single swipe.

MSRs are also configured to recognize track data received in a forward direction, and to recognize track data received in a backward "reverse" direction. In the forward direction, the bits corresponding to the start sentinel 210/310/410 of a respective channel are received by the MSR before the bits corresponding to the end sentinel 210/310/410 for that channel. In the backward direction, an entirety of the bits constituting a track are received in a reversed order. This arrangement accommodates a "double swipe," where a person pushes/pulls the stripe 11 along the read heads in one direction, and then without re-orienting the card, pulls/pushes the card back across the read heads in the reverse direction.

Disadvantageously, the data on the magnetic stripe 11 of a conventional credit or debit card is static and subject to copying and fraud. In recent years, to reduce the fraud associated with static magnetic stripe cards, electronic cards and contactless payment methods have been developed. Electronic cards and contactless methods allow the data that is provided to a POS terminal to be dynamically modified, making such approaches less susceptible to copying fraud than conventional magnetic stripe payment cards.

Electronic cards are inserted into the slot in the housing of a POS terminal and swiped along the read heads of an MSR in the same manner as a conventional magnetic stripe card 100. Electronic cards include a series of inductors arranged along a portion of at least one of the tracks 101/102/103 to simulate magnetic domains. An electronic card may include a track having both static and dynamic segments, with conventional magnetic stripe material used for the static portions, and the series of inductors providing the dynamic portions.

Since F2F requires two magnetic domains to encode a binary one, the electronic card must provide two inductors in series for each bit of simulated track data. For example, to dynamically simulate ten F2F-encoded bits, the simulated portion of the track must include twenty inductors. For each binary 0 bit, the two inductors corresponding to a bit will be configured to produce a same orientation of magnetic polarity (for example, S-N and S-N), thereby simulating a single domain. For each binary 1 bit, the two inductors corresponding to the bit will be configured to produce opposite magnetic polarities (for example, S-N and N-S), thereby simulating two domains with a signal-inducing transition in-between.

An example of a contactless payment method uses Near-Field Communications (NFC). NFC employs electromagnetic induction between a loop antenna in a handheld device and a loop antenna in a POS terminal to bidirectionally exchange information back-and-forth between the handheld device and the POS terminal. NFC operates at radio frequencies, using the globally available unlicensed radio frequency ISM band of 13.56 MHz, and transferring information at higher data rates than is possible with swiped magnetic stripe cards 100 and electronic cards. In order to be compatible with contactless methods like NFC, each POS terminals must include the needed loop antenna and receiver.

Another example of a contactless method uses an inductive loop to interact directly with the magnetic read heads (e.g., 501, 502, and 503) of the MSR. Unlike the dynamic segments of electronic cards, a single inductive loop is all that is required to simulate the entire magnetic stripe 11. Unlike the bidirectional communication used by NFC payment systems, this approach to communication with the POS terminal is limited to transmission in only one direction: from the handheld device to the POS terminal via the magnetic read heads.

An advantage of transmitting data directly to the magnetic read heads is that the POS terminal does not require any special capabilities, making the system compatible with most any POS terminals that includes a legacy MSR. For example, a POS terminal is not required to have a Near-Field Communication (NFC) receiver. Instead, a magnetic-stripe-simulating device is held in close proximity to the MSR of a POS terminal and emits a sequence of magnetic pulses from the inductive loop. While proximity between the simulating device and receiving read heads may be close, no contact is required between the simulating device and the MSR, and nothing is physically swiped by the read heads.

Instead, the simulating device generates a magnetic pulse sequence by applying a time-modulated alternating current to an inductive loop. The fluctuating magnetic field generated by the inductive loop in response to the alternating current is used to transfer F2F-encoded bits to the MSR. The data rate that is used is commensurate with a data rate that would occur if swiping a conventional magnetic stripe card across the read heads. Each reversal of the polarity of the bipolar current causes the magnetic field emitted by the inductive loop to reverse polarity The time-varying magnetic flux induces a signal in the read heads (e.g., 501, 502, and 503) similar to that caused by the transitions between magnetic domains that would occur when swiping a conventional card track 11. Typically, the inductive loop needs to be within approximately three inches (7.6 cm) of the read heads 500. The field generated by the loop dissipates rapidly beyond that point, which helps prevent the pulse sequence from being picked up by eavesdropping devices (as may not be the case with NFC transmission devices using radio frequency transmissions).

With conventional magnetic stripes, the fields generated by the magnetic domains that correspond to the data in each track/channel are narrow and confined to the reading aperture of the corresponding channel's read-head. For example, the influence of the field generated by Track 1 101 is confined to the first track read head 501, and the field generated by Track 2 102 is confined to the second track read head 502.

In comparison, the electronically-generated magnetic fields produced by the inductor(s) in magnetic stripe simulating devices may be wider than those produced by conventional magnetic stripes, resulting in the magnetic fields corresponding to a channel being picked up by the read head(s) of adjacent track(s). This problem is referred to as cross-channel "leakage." Because the different tracks' data are formatted differently, are mutually incompatible, and/or contain different content payloads, the leakage of a specific track's magnetic fields into an adjacent track's read head can cause reading errors.

For example, if the magnetic field sequence corresponding to the higher density seven-bit characters of Track 1 101 leaks into the Track 2 read head 502, the data parsing software that was expecting the five-bit characters of Track 2 102 may indicate an error. Conversely, when Track 2 102 data leaks into Track 1 read head 501, the encoded data and the LRC may be incorrectly decoded. Because of the close proximity of the tracks in a standard card stripe 11 and because of a lack of standardization among card readers, it is difficult to prevent the cross-channel leakage.

Another example of cross-channel leakage is a conflict that can arise between Track 2 102 and Track 3 103, which both use five-bits per character, the same control characters, and include a Primary Account Number, but have different data densities and otherwise carry different payloads. Due to similarities between the Track 2 and Track 3 formats, some POS terminals may implement additional logic to check to see if the data output by the Track 2 and Track 3 decoders are equal, and return an error if "T2==T3" is true.

Cross-channel leakage may be particularly problematic for magnetic stripe transmission devices that apply a time-modulated current to a single inductive loop to interact directly with multiple magnetic read heads, since the emitted field necessarily interacts with more than one read head. While the POS terminal decoder software is designed to accommodate relatively minor track noise, such as the noise generated by scratches and small defects in the magnetic stripe 11, the decoder software can be easily overwhelmed by the substantial errors caused by cross-channel leakage. Unable to handle these exception conditions, the POS terminal will terminate the transaction.

Ideally, the decoders in the MSR are able to differentiate between channel data. One way a channel decoder may accomplish this task is by buffering the signal received from a read head, and processing the buffered data to detect an occurrence of the forward-or-backward bit patterns of a control character (e.g., the start sentinel, the end sentinel, or both). Errors can occur for a variety of reasons, such as when a decoder misidentifies a bit pattern. For example, a Track 2 decoder might detect five sequential bits that correspond to the Track 2 Start Sentinel 310, but the bits are actually part of a seven bit character in the Track 1 payload 211. Intra-channel errors can also occur at the MSR, such as clock- or-bit reconstruction errors. The decoder experiencing the errors may time-out or experience buffer overflow, missing the correct data in the stream.

SUMMARY

This disclosure relates generally to an improved three-state "ternary" information encoding process and associated hardware that transmits track data for two-or-more magnetic stripe tracks as a sequence of magnetic-field pulses from the inductor of a magnetic-stripe-simulating device directly to the read heads (e.g., 501, 502, and 503) of a POS terminal. The improved ternary encoding process ("ternary" being interchangeable with "trinary") and apparatus is implemented to overcome cross-channel leakage problems and provide a higher degree of reliability, increasing the likelihood of the POS terminal correctly reading the pulse transmissions, and increasing the reliability and efficacy of magnetic-stripe-simulating devices. The introduction of the third state also allows additional information to be encoded in the pulse stream to be decoded by compatible MSRs, while that same additional information will be harmlessly ignored by legacy terminals.

In order to communicate data for multiple channels using a single magnetic pulse stream, data encoded for different channels may be arranged serially within the stream according to the hardware and process (method) of the disclosure.

The encoding scheme uses three-state ternary "trits" (in comparison to two-state binary "bits"). Two of the three trit states cause an inductive loop to emit positive magnetic flux or negative magnetic flux (respectively), allowing the encoding scheme to replicate F2F signaling states. The third state is a nothing "n" state that causes the inductive loop to emit no magnetic flux. The n-state can be used to create gaps in the track data encoded in an F2F sequence, to change the density or frequency of an F2F pulse sequence, and/or to transfer additional information in the midst of an F2F pulse sequence. A single n-state trit has a same "length" as a "zero" or "one" state trit, with each n-state trit creating a gap in the magnetic flux having a duration in time equivalent to the emission of a single F2F-encoded bit at a same baud rate. Short gaps can be created using fractional n-states (such as a one-half n-state). Extended gaps can be generated using a continuous series of n-states in integer multiples and/or fractions.

The gaps introduced into an F2F sequence are used to target portions of the magnetic pulse stream at a particular channel's decoder by leveraging differences in channel buffer sizes and card-present timers between channel decoders. Changes in density and/or frequency may also be used to target the portions of the magnetic pulse stream at a particular channel's decoder by leveraging differences in frequency response characteristics between decoder channels.

Additional information can be encoded and embedded in the magnetic pulses by controlling the timing and length of gaps in the flux emissions, with the gaps arranged in one-or-more patterns to embed a steganographic message in the emitted magnetic flux signal. For example, the gaps can be arranged to create dot-dash patterns as an inverse-Morse code, or to alternate between emitted magnetic flux and no flux to replicate a barcode pattern.

In a two-state binary system, F2F signaling causes transitions between positive flux and negative flux emissions, simulating the transitions between magnetic domains. Such transitions cross a zero-emission flux level, but do not maintain that level. In the three-state ternary system, the n-state trit causes the zero-emission flux level to be temporarily maintained as part of the emitted signal until a next zero or one-state trit occurs in the ternary signal. Thus, when an n-state trit is added in the midst of an F2F signal, the transition between the positive and negative flux is not continuous, instead producing a continuous transition between positive and neutral (i.e., the "n" state), and a separate continuous transition between negative and neutral. The duration that the zero-emission level is maintained is dependent on the baud rate of the ternary signal, and the number of consecutive n-state and n/2 trits in that signal.

Transitions to-and-from the zero-flux state caused by an n-state trit induce the generation of smaller amplitude peaks from the output of the read heads 500, relative to the peaks produced by a continuous transition between positive-to-negative and negative-to-positive flux transitions. However, with sufficient proximity, emission energy, and receiver sensitivity, such transitions will generate a signal pulse from the read heads 500 in the MSR that the channel decoder can process.

BRIEF DESCRIPTION OF THE DRAWINGS

FIG. 2 illustrates a structure of the data encoded on the first track of the magnetic stripe of FIG. 1 in accordance with existing industry standards.

FIG. 3 illustrates a structure of the data encoded on the second track of the magnetic stripe of FIG. 1 in accordance with existing industry standards.

FIG. 4 illustrates a structure of the data encoded on the third track of the magnetic stripe of FIG. 1 in accordance with existing industry standards.

FIGS. 20 and 21 illustrate examples of how the rate of change in the baud rate according to the system, process, and apparatus of the disclosure may be used to differentiate channels.

DETAILED DESCRIPTION

Figure 1:
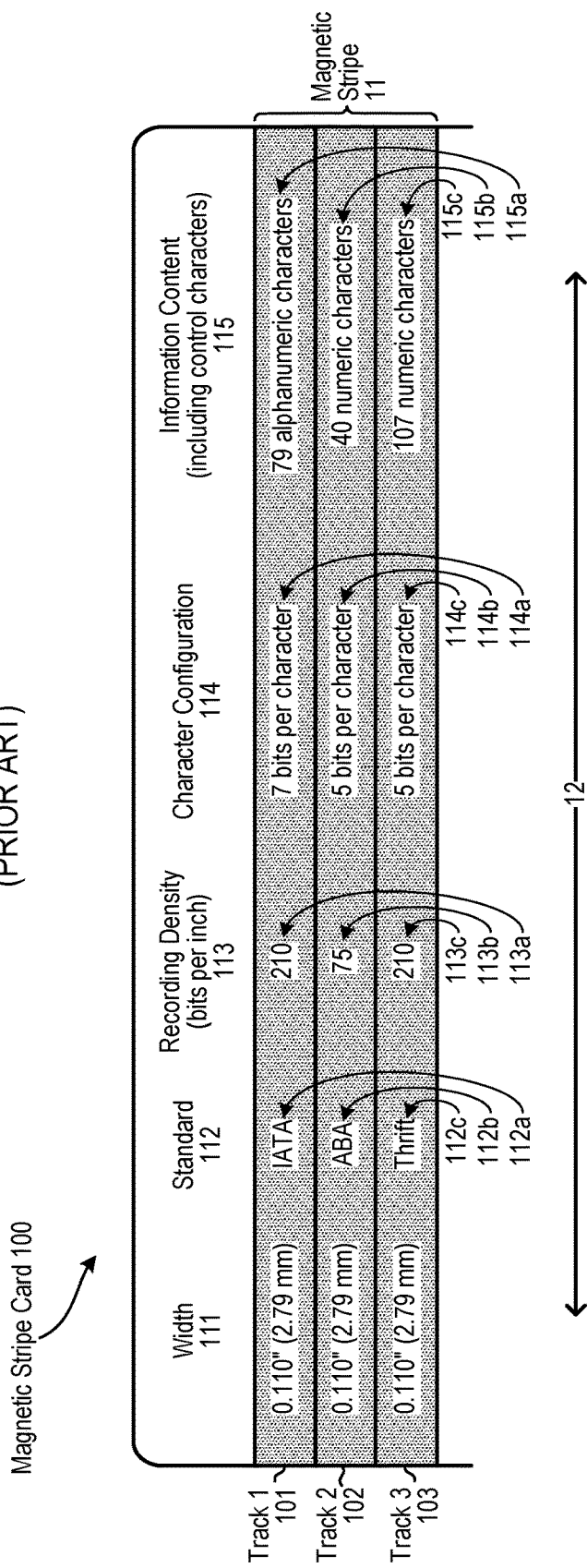
FIG. 1 illustrates a typical magnetic stripe and its tracks in accordance with existing industry standards.
Figure 5:
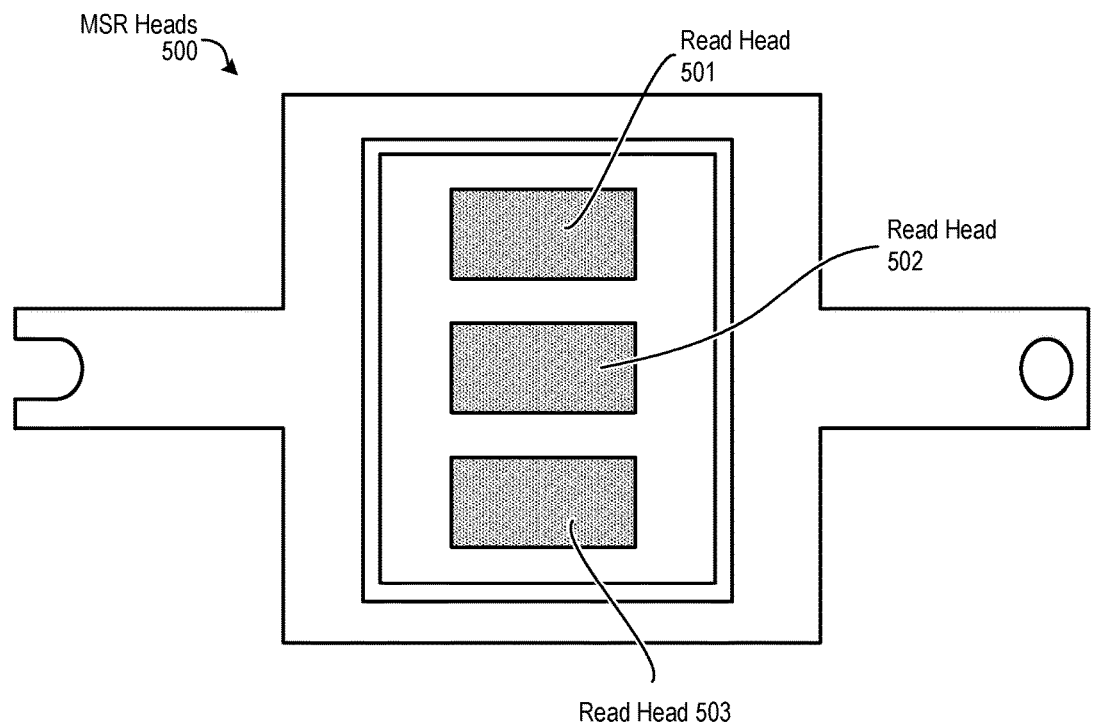
FIG. 5 illustrates a structural arrangement of a magnetic stripe reader (MSR) including three read heads, as used with or included in point-of-sale (POS) terminals.

Track data for different channels can be arranged serially within a magnetic pulse stream. Each character of track data is represented by a plurality of binary bits in accordance with the character configuration 114. Prior to transmission, the binary bits are encoded as F2F data. Each binary "1" bit is encoded to generate magnetic flux transitions at the edges of the bit, and another transition at the center of the bit. Each binary "0" bit is encoded to generate magnetic flux transitions at the edges of the bit, with no transition at the center of the bit.

The track data may be arranged in either the forward or reverse bit-order, and the data for a channel may be included more than once in a transmission sequence. For example, a "T2-T1R" stream includes Track 2 102 data in forward bit-order, followed by Track 1 101 data in reverse bit-order (as denoted by the "R"). As another example, a "T2-T1R-T2R" stream includes Track 2 102 data in forward bit-order, followed by Track 1 101 data in reverse bit-order, followed by a second copy of Track 2 102 data in reverse bit-order.

A stream may include "null" data for a secondary channel. The "null" data conforms to a track standard 112, but omits meaningful information for the channel (e.g., substituting one-or-more binary zeros for the contents of the track fields). The inclusion of "null" data is useful when communicating with POS terminals that require secondary track data in order to process a transaction, but never actually verify the contents of the "null" secondary track (such as when a merchant's system requires the inclusion of secondary track data for data mining and marketing purposes, but never actually verifies that secondary data with the card issuer). For example, a "T1N-T2" stream includes null data in the format specified by the Track 1 standard 112a in forward bit-order (as denoted by the "N"), and Track 2 data 102 in the forward bit-order. As another example, a "T2-T1NR" stream includes Track 2 102 data in forward bit-order, followed by null data in the format specified by the Track 1 standard 112a in reverse bit-order.

Abbreviated or proxy versions of a secondary track format can also be inserted in the signal stream according to the hardware and processes of the disclosure. Abbreviated versions conform to the track standard, but omit a portion of the conventional track data (e.g., substituting one-or-more zeros or a field separator for omitted data). Proxy versions of secondary track data may include start and end sentinels and an LRC character in either forward or reverse bit-order, but the payload bit-sequence (e.g., 211, 311, 411) may depart from the track standard 112.

Other data may be inserted into the magnetic pulse stream in order to increase the likelihood that POS terminal will properly process the track data, such as including F2F-encoded binary zeros prior to and/or after the track data for a channel. The F2F-encoded zeros are emitted at a same baud rate as time-adjacent track data. The F2F-encoded binary zeros serve as clocking bits to improve synchronization and clock regeneration by the channel decoder(s).

The success or failure of a stream format may vary from POS-terminal to POS-terminal. A magnetic-stripe-simulating device can be configured according to the disclosure to try a different stream format (also referred to as "frameworks") if an initial attempt fails, such as when a device user presses the "pay" button more than once within a threshold amount of time (indicating a likelihood that the prior stream transmission was rejected by the POS terminal). The magnetic-stripe-simulating device may select frameworks based on, among other things, a hierarchical table of frameworks and the geographic/regional location in which the transaction is being performed.

The successful reception of a multi-channel serial stream transmission depends in part on each decoder in the MSR correctly detecting bits in the stream for that decoder's channel, while ignoring or discarding the bits corresponding to other channels. Since all of the read heads 500 will receive all of the magnetic pulses emitted for all of the channels, the deluge of pulses can easily exceed a decoder's ability to handle cross-channel leakage, which will cause a transaction to fail.

Figure 6:
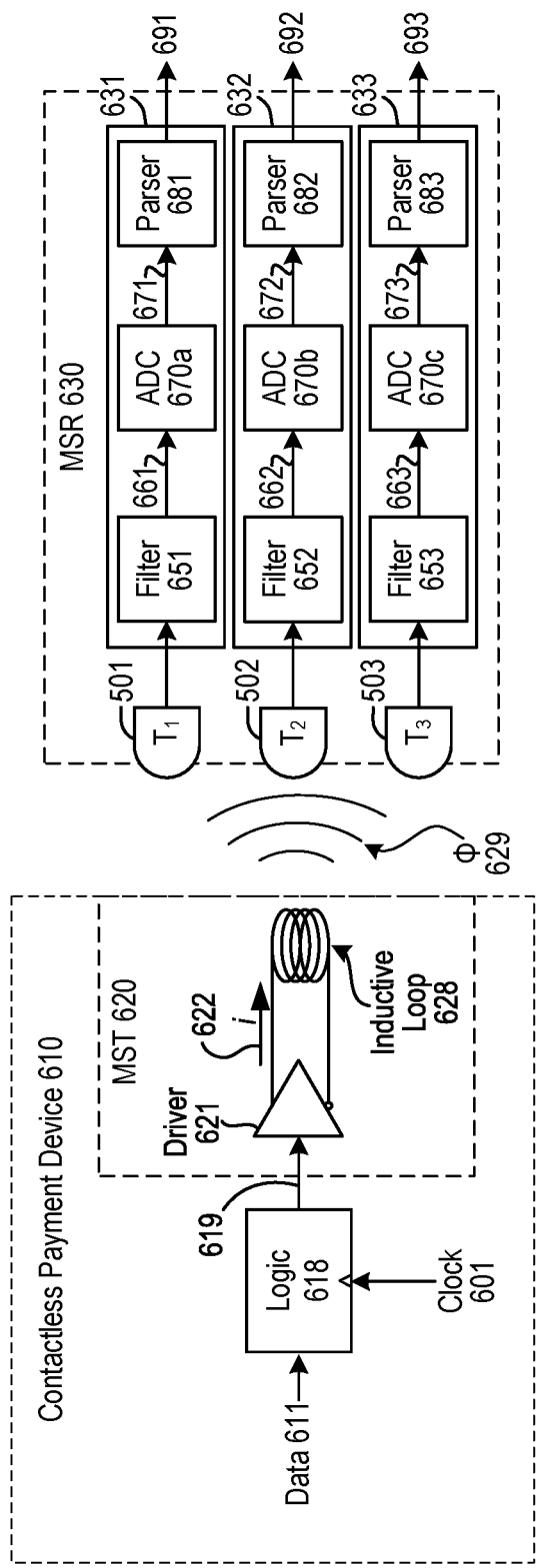
FIG. 6 is a block diagram illustrating the inductive coupling of an improved magnetic pulse transmitter according to the disclosure, transmitting to a conventional MSR.

FIG. 6 is a block diagram illustrating the inductive coupling of an improved contactless payment device 610 ("transmitter") to a conventional MSR 630 ("receiver"). The transmitter 610 includes a logic circuit 618 and an MST (Magnetic Secure Transmission) device 620. A driver 621 in the MST device 620 receives an electrical signal 619 from the logic circuit 618 comprising F2F-encoded pulses. Based on the encoded pulses, the driver 621 outputs a time-variable electrical current 622 to an inductive loop 628, causing emission of a magnetic flux Φ (phi) 629. Changes in the polarity of the magnetic flux Φ 629 are used to transmit magnetic stripe information from the transmitter 610 to the MSR 630 of a POS terminal.

The MSR 630 is configured to receive information from two or three tracks 101/102/103 when a magnetic stripe 11 is swiped across the corresponding magnetic read heads 501/502/503 in a conventional manner. However, as illustrated in FIG. 6, instead of a card swipe across the read heads 500, the heads receive the magnet flux Φ 629 emitted from the transmitter 610.

The Track 1 read head 501 outputs an electrical signal to a Track 1 decoder 631, based on the magnet flux Φ 629 received by the read head 501. The Track 2 read head 502 outputs an electrical signal to a Track 2 decoder 632, based on the magnet flux Φ 629 received by the read head 502. The Track 3 read head 503 outputs an electrical signal to a Track 3 decoder 633, based on the magnet flux Φ 629 received by the read head 503. Signal amplifiers may be included to amplify the electrical signals from the read heads 501/502/503 (not illustrated).

In response to the Track 1 decoder 631 detecting Track 1 101 data in the received stream of pulses from the read head 501, the Track 1 decoder 631 decodes the pulses to identify 7-bit characters (in accordance with character configuration 114a), and outputs decoded Track 1 data 691 to the POS terminal.

In response to the Track 2 decoder 632 detecting Track 2 102 data in the received stream of pulses from the read head 502, the Track 2 decoder 632 decodes the pulses to identify 5-bit characters (in accordance with character configuration 114b), and outputs decoded Track 2 data 692 to the POS terminal.

In response to the Track 3 decoder 633 detecting Track 3 103 data in the received stream of pulses from the read head 503, the Track 3 decoder 633 decodes the pulses to identify 5-bit characters (in accordance with character configuration 114c), and outputs decoded Track 3 data 693 to the POS terminal.

The Track 1 decoder 631 includes a low-pass or bandpass filter 651, that receives the electrical signal output by the Track 1 read head 501 as input, and outputs a filtered signal 661. The filtered signal 661 is input into an Analog-to-Digital Converter (ADC) 670a, producing a digital representation 671 of the filtered signal 661. The digital representation 671 is input into a Track 1 parser 681 which identifies pulses in the digital representation 671 of the filtered signal 661, determines the embedded clock rate, decodes the F2F encoding, and parses decoded bits to identify and output the Track 1 data 691 as a string or strings of alphanumeric characters (e.g., alphanumeric corresponding to those from Track 1 payload 211).

The Track 2 decoder 632 includes a low-pass or bandpass filter 652, that receives the electrical signal output by the Track 2 read head 502 as input, and outputs a filtered signal 662. The filtered signal 662 is input into an ADC 670b, producing a digital representation 672 of the filtered signal 662. The digital representation 672 is input into a Track 2 parser 682 which identifies pulses in the digital representation 672 of the filtered signal 662, determines the embedded clock rate, decodes the F2F encoding, and parses decoded bits to identify and output the Track 2 data 692 as a string or strings of numeric characters (e.g., numeric corresponding to those from Track 2 payload 311).

The Track 3 decoder 633 includes a low-pass or bandpass filter 653, that receives the electrical signal output by the Track 3 read head 503 as input, and outputs a filtered signal 663. The filtered signal 663 is input into an ADC 670c, producing a digital representation 673 of the filtered signal 663. The digital representation 673 is input into a Track 3 parser 683 which identifies pulses in the digital representation 673 of the filtered signal 663, determines the embedded clock rate, decodes the F2F encoding, and parses decoded bits to identify and output the Track 3 data 693 as a string or strings of numeric characters (e.g., numeric corresponding to those from Track 3 payload 411).

The inner-workings and tolerances of MSRs 630 generally vary from manufacturer-to-manufacturer and from model-to-model, but based on experimental sampling, certain analog-signal handling characteristics and principles of operation can be generalized. The representations of the inner-workings of the decoders 631/632/633 in FIG. 6 (and FIG. 11) are circuit models based on such generalization.

Based on test payment transactions with a variety of different MSRs, several differences between channels may exist within any given MSR. The signal-response characteristics of read heads 501/502/503 and/or the filters 651/652/653 may vary between channels. The decoders 631/632/633 may have different tolerances for changes in the baud rate of the track data encoded in a received stream of magnetic pulses, and have different tolerances for gaps between flux transitions in the stream. The size of the data buffers in the decoders may vary between channels, as may the gap duration triggering expiration of a card-present timer. While these characteristics and tolerances may vary from MSR-to-MSR, there appear to be some commonalities that can be leveraged to improve the likelihood that each channel will receive its intended data and ignore the rest, without exceeding the limits of a decoder's noise tolerance (causing a transaction to fail).

Ternary encoding is used to improve successful reception of track data by using n-state trits to selectively cause decoder time-outs and buffer overflows. Based on the order of track data in the ternary code and the size and position of gaps in the magnetic pulse stream, the ternary code causes particular channel decoders to time out and/or overflow, thereby causing those decoders to disregard a portion of the data stream.

The transmitter 610 includes a logic circuit 618. The logic circuit 618 receives ternary data 611. The ternary data includes three states: 0, 1, and n. A single base-3 trit can be used to express all three states (e.g., as three different voltage levels), or each trit can be represented by a plurality of binary bits. For example a trit "0" can be represented as in bits as "01", a trit "1" can be represented in bits as "11", and a trit "n" can be represented in bits as "00".

The logic circuit 618 receives a clock signal 601 and a ternary data signal 611. The logic circuit 618 performs F2F-encoding on track data included in the signal 611, outputting a signal 619 comprising an F2F-encoded version of the data 611. The logic circuit 618 outputs the signal 619 at a rate corresponding to one-full-trit of received data 611 per cycle of the clock 601.

Figure 7:
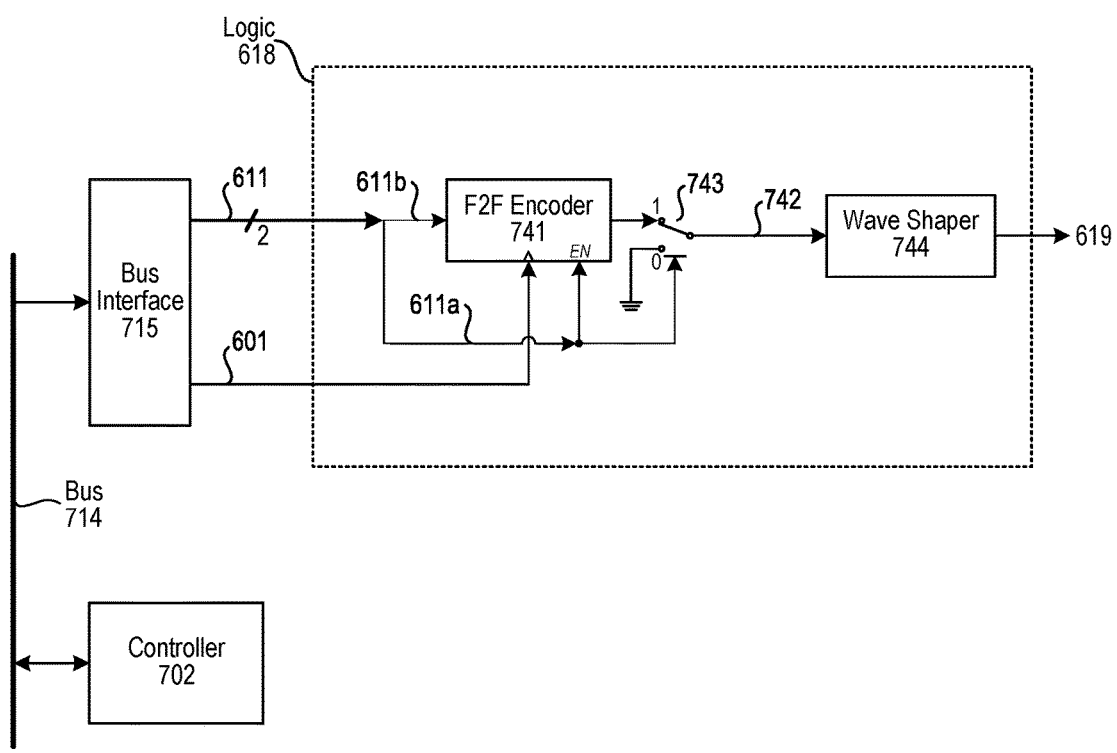
FIG. 7 is a block diagram illustrating an example of the transmitter's logic component in FIG. 6.

FIG. 7 is a block diagram illustrating an example of the transmitter's logic component 618 from FIG. 6. As illustrated, a controller 702 transmits signals via a bus 714 to a bus interface 715. The bus interface 715 of the transmitter 610 provides the input signals to the logic circuit 618, including the ternary data signal 611 and the clock signal 601. The bus interface 715 may be used to connect the logic circuit 618 to any sort of bus or busses 714, including one-or-more parallel busses, serial-busses, or a combination thereof. For example, the bus 714 may be a two-line I²C (Inter-Integrated Circuit) serial bus. The ternary data 611 may be received over the I²C bus Serial Data Line (SDA) and the clock signal 601 may be based on the I²C bus Serial Clock Line (SCL) (e.g., a down-converted version of the SCL signal), or based on some other clock signal.

The bus interface 715 may include a data buffer (not illustrated), with the bus interface 715 de-queueing one trit-per-cycle of the clock signal 601 from the buffer to be output to the logic 618, as represented by the parallel binary bits 611a and 611b. For example, the bus interface 715 may store received trits in a First-In-First-Out (FIFO) data buffer, such as a circular FIFO queue that overwrites the oldest data when new data is received and the queue is full. As another example, the bus interface 715 may store received trits in a First-In-First-Stay (FIFS) data buffer. A FIFS data buffer retains stored data until it is de-queued (read). Data is only stored in the FIFS queue when space is available, such that old data is not overwritten prior to being de-queued. When the queue (FIFO, FIFS, etc.) is full, the bus interface 715 may signal the controller 702 so that the controller 702 pause transmission of the ternary data.

The clock signal 601 controls the transmission baud rate. In the context of the ternary signaling in this disclosure, one baud equals one trit-per-second. The frequency of the clock signal 601 may be a software-controlled by the transmitter's controller 702, using a software-configurable programmable digital frequency divider, using a software-configurable programmable clock generator, or generated by the controller 702 itself using programmable timers. Frequency dividers (also known as "clock dividers") receive an input signal of frequency $f_{in}$, and generate a "down-converted" output signal of a frequency $f_{out}$. The frequency $f_{out}$ equals $f_{in}$ divided by n, where n is a non-zero positive integer. Instead of using a bus connection 714, the logic circuit 618 may receive the data 611 and/or the clock signal 601 directly from the transmitter's controller 702.

An F2F encoder 741 receives the bit signal 611b, which corresponds to track data and other binary data (e.g., zeroes for clock synchronization). The output of the F2F encoder 741 is connected to a first input line of a switching circuit 743 (for example, a bilateral switch, a transmission gate, or a 2-to-1 multiplexer). A second input line of the switching circuit 743 is connected to a reference voltage. The switching circuit 743 selects between input lines in accordance with the state of the bit signal 611a. When the bit signal 611a is "1", the voltage level of the F2F encoder output signal determines the voltage level of the switching circuit output signal 742. When the bit signal 611a is "0", the reference voltage determines the voltage level of the output signal 742.

Figure 9:
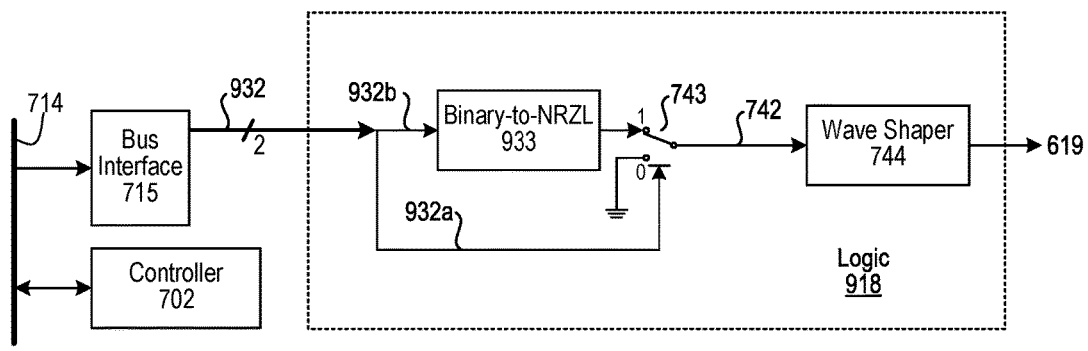
FIG. 9 is a block diagram illustrating alternative logic that can be used when the F2F-encoder in FIG. 7 is integrated in or implemented by the transmitter's controller.

The reference voltage is set to be half-way between the positive and negative voltage levels of the F2F signal (e.g., +V and −V), and will typically be zero volts. In FIGS. 7 and 9, the reference voltage is illustrated as a ground connection (representing zero volts).

The F2F encoder 741 may have an "enable" input controlled by the bit signal 611a. When the bit signal 611a is "1", the F2F encoder 741 runs, encoding one bit of the bit signal 611b per cycle of the clock signal 601. When the bit signal 611a is "0", the F2F encoder 741 is disabled, freezing the output at whatever the output voltage level was when the bit signal 611a became "0". When the bit signal 611a returns to "1", the polarity of the bipolar output of the F2F encoder 741 will transition to the opposite voltage level (i.e., from +V to −V or from −V to +V). This enable and disable function may also be achieved by freezing the state of the clock signal 601 input into the F2F encoder 741 when the bit signal 611a is "0", and allowing the clock to run when the bit signal 611b is "1". Suspending the output of the F2F encoder 741 in response to n-state trits is not required, but provides predictability as to what direction the voltage will swing when transmission of the F2F signal resumes.

The output signal 742 from the switching circuit 743 may be input directly into the driver 621 as output signal 619, or a wave shaper 744 may optionally be interposed therebetween. The wave shaper 744 modifies the shape of the transitions in signal 742 to improve coupling of the magnetic flux Φ 629 with the MSR read heads 500. For example, the wave shaper 744 may smooth the leading edge of each positive transition and each negative transition to provide a gradual rise time to a peak positive or negative level.

Figure 8:
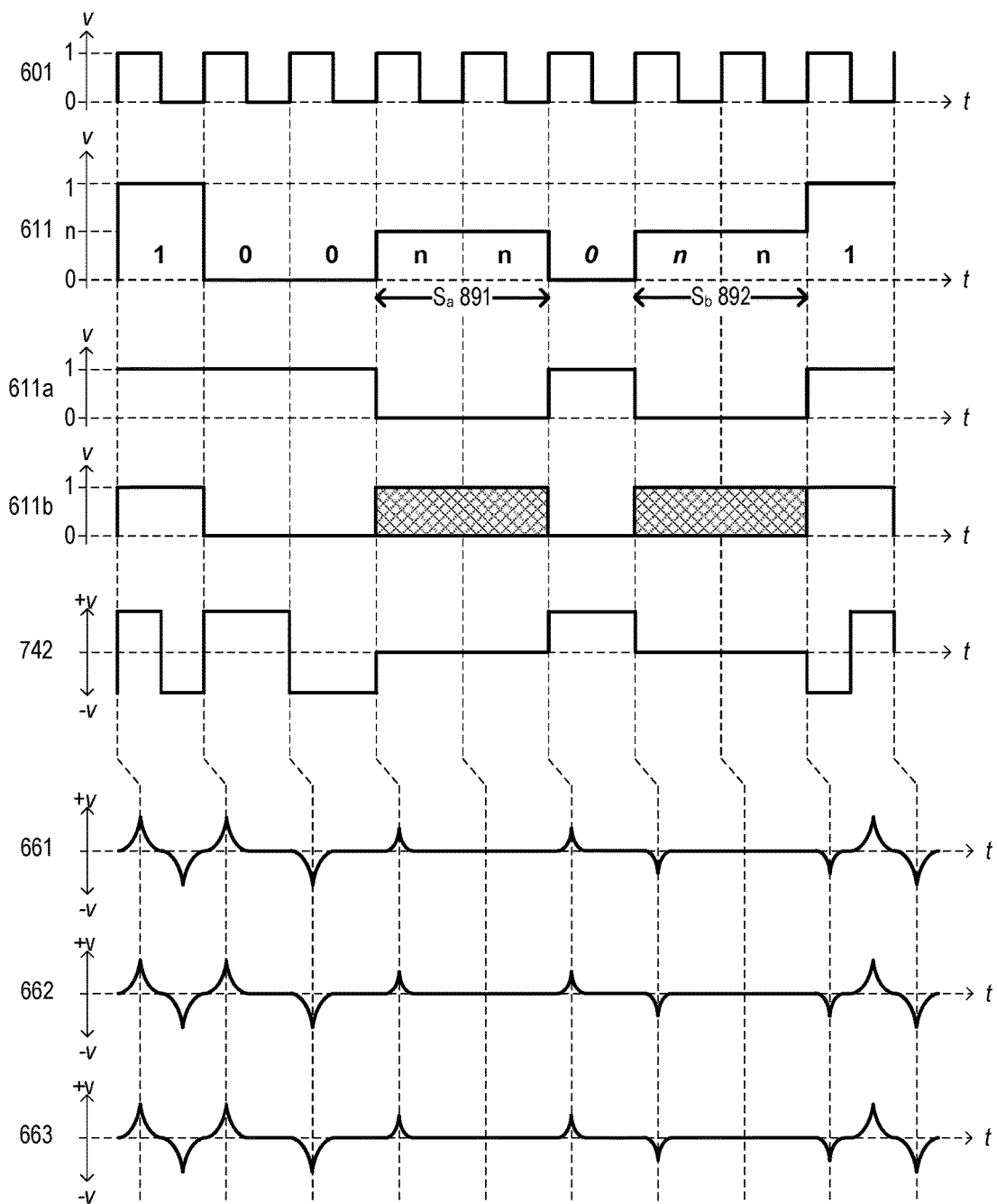
FIG. 8 is a timing diagram introducing basic operations of a system according to the disclosure.

FIG. 8 is a timing diagram introducing basic operations of the system. As illustrated, one full trit of the ternary data 611 coincides with one full cycle of the clock signal 601. The ternary data 611 is expressed by a bit 611b that corresponds to track data and synchronization bits, and by a bit 611a that indicates whether or not the trit is an n-state trit.

In this example, the ternary data 611 is in the n-state during the time periods $S_a$ 891 and $S_b$ 892. The hatching of the bit signal 611b coinciding with time periods $S_a$ 891 and $S_b$ 892 indicates that the state of the output signal 742 is independent of the state of the bit signal 611b during the time periods $S_a$ 891 and $S_b$ 892.

When the ternary signal 611 is in the "0" or "1" state, the F2F encoder 741 converts the track data and other bits received via bit signal 611b into the F2F-encoded pulses 742. Each binary "1" (coinciding with a ternary "1") in the data 611 results in one positive and one negative F2F pulse per cycle of the clock 601. This produces a transition at the beginning of the bit/trit, at the middle of the bit/trit, and at the end of the bit/trit. Each binary "0" (coinciding with a ternary "0") in the data 611 results in a single F2F pulse per cycle of the clock 601. This produces a transition at the beginning of the bit/trit and at the end of the bit/trit.

Each reversal in the polarity of an F2F-encoded pulse in the signal 742 reverses the polarity of the magnetic flux Φ 629. As a consequence, each transition of the signal 742 from −V to +V causes the read heads 501, 502, and 503 to produce a positive pulse. Likewise, each transition of the signal 742 from +V to −V causes the read head 501, 502, and 503 to produce a negative pulse. Each transition of the voltage from +V to zero, zero to −V, −V to zero, and zero to +V also causes a corresponding change in the magnetic flux Φ 629, but may produce smaller-magnitude pulse outputs from the read head 501, 502, and 503 than were caused by the full transition between +V and −V.

In this example, the baud rate of the ternary data 611 and clock signal 601 is compatible with all of the channels of the MSR 630, such that each of the positive and negative pulses output by the read heads 501, 502, and 503 appears in the filtered signal 661, 662, and 663 output by the corresponding filter 651, 652, or 653. The particular pattern of one and zero trits illustrated for ternary data signal 611 are intended to demonstrate operational principles, and do not necessarily correspond to characters or symbols compliant with a corresponding track standards 112.

As an alternative to connecting the logic circuit 618 to the controller 702, the logic circuit 618 may be partially or entirely integrated into the controller 702, implemented in software/firmware, hardware, or some combination thereof. FIG. 9 is a block diagram illustrating alternative logic circuit 918 that can be used when the F2F encoder 741 is integrated into the transmitter's controller 702, or the transmitter's controller 702 is otherwise providing F2F-encoded track data.

Figure 10:
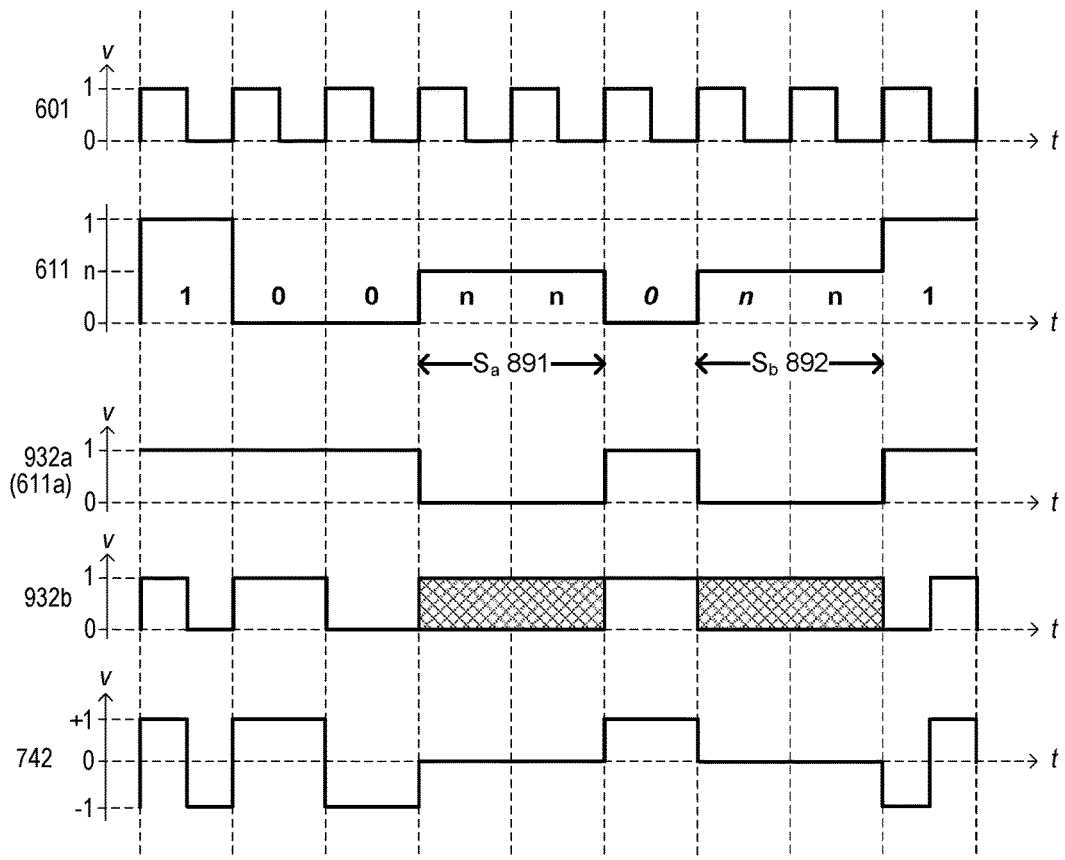
FIG. 10 is a timing diagram introducing operation of a system implementing the alternative logic from FIG. 9.

In FIG. 9, the bus interface 715 again outputs one full trit per cycle of the clock signal 601. In this example each trit is represented by the parallel binary bits 932a and 932b. FIG. 10 is a timing diagram illustrating basic operation of a system implementing this alternative arrangement. As illustrated, the ternary data 611 in FIGS. 8 and 10 are identical, as are the bit signals 611a and 932a, and the output signals 742. The difference between the bit signal 611b and the bit signal 932b is that the bit signal 932b is a binary signal representing F2F-encoded data, whereas the bit signal 611b is not F2F encoded.

As illustrated in FIG. 9, the logic circuit 918 includes a binary-to-non-return-zero level (NRZL) converter 933, the switching circuit 743, and the wave shaper 744. When the encoded signal 932b is a binary "1", the converter 933 outputs the +V voltage level. When the encoded signal 932b is a binary "0", the converter 933 outputs the −V voltage level.

The bipolar output from the NRZL converter 933 is connected to a first input line of a switching circuit 743. The switching circuit 743 selects between input lines in accordance with the state of the bit signal 932a. When the bit signal 932a is "1", the voltage level of the bipolar F2F signal from the NRZL converter 933 determines the voltage level of the output signal 742. When the bit signal 932a is "0" (indicating an "n" trit), the reference voltage determines the voltage level of the output signal 742. As discussed in connection with FIG. 7, the output signal 742 from the switching circuit 743 may be input directly into the driver 621 (as output signal 619), or the wave shaper 744 may optionally interposed therebetween.

Figure 11:
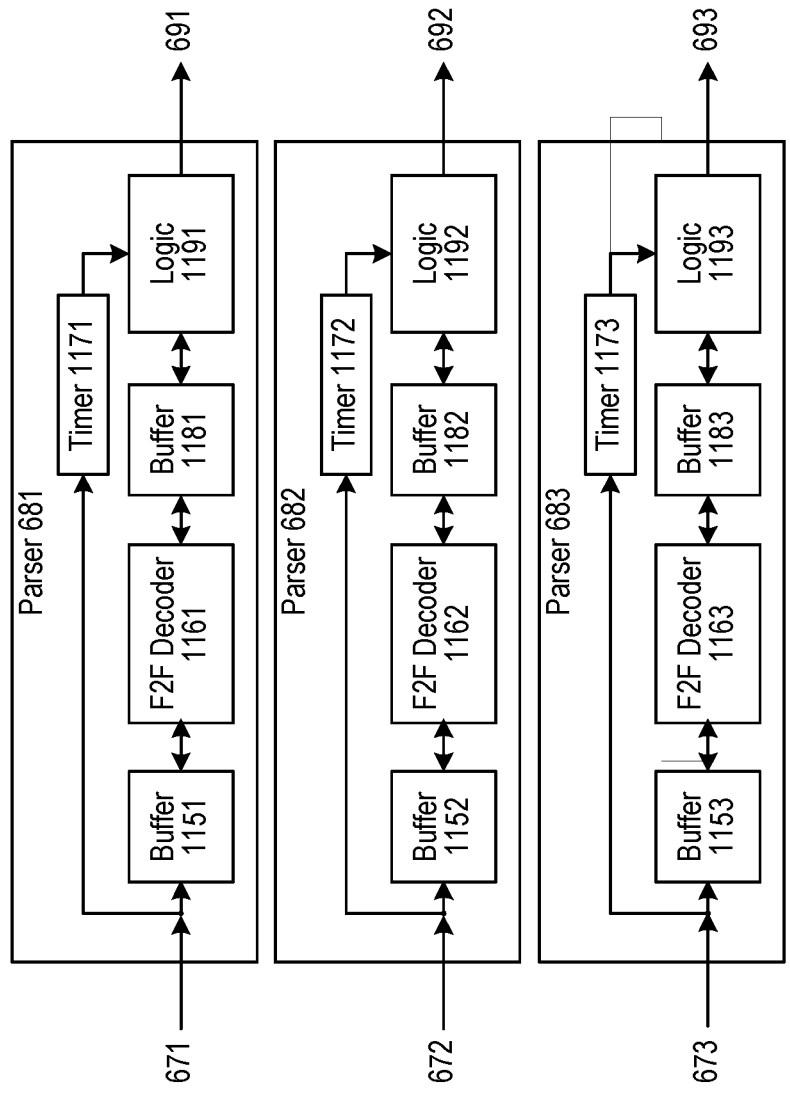
FIG. 11 is a block diagram illustrating components of a conventional MSR parser components.

FIG. 11 is a block diagram illustrating example components of an MSR parser. The Track 1 parser 681 may include a first-in-first-out (FIFO) buffer 1151, an F2F decoder 1161, a card-present timer 1171, a buffer 1181, and parser logic 1191. The Track 2 parser 682 may include a FIFO buffer 1152, an F2F decoder 1162, a card-present timer 1172, a buffer 1182, and parser logic 1192. The Track 3 parser 683 may include a FIFO buffer 1153, an F2F decoder 1163, a card-present timer 1173, a buffer 1183, and parser logic 1193.

During data collection, the digital representations 671/672/673 of the filtered signals 661/662/663 are buffered in a FIFO buffers 1151/1152/1153 at the sampling rate of the ADCs 670. When the F2F decoders 1161/1162/1163 process the digitized signal 671/672/673 from their respective buffer, the clock timing embedded in received F2F signals is determined so as to adapt to variations in card swipe speed. Based on the embedded clock timing, the F2F decoders identify the edges of the encoded bits. When a pulse occurs at an edge of a bit and at the center of a bit, the decoder records a binary "1" in the corresponding buffer 1181/1182/1183. When a pulse occurs at an edge of a bit and no pulse is recorded within the bit, the decoder records a binary "0."

Loading the decoded bits into buffers 1181/1182/1183 facilitates processing by the logic 1191/1192/1193 to extract track data 101/102/103 from the stored bit sequences, since each track bit-sequence may be in forward or reverse bit order. The capacity of the buffers 1151/1152/1153 and 1181/1182/1183 may vary from channel-to-channel.

The decoder logic 1191/1192/1193 searches the decoded bits in the respective buffer 1181/1182/1183 for the track's Start Sentinel 210/310/410 in forward and reverse bit-orders. Processing of the buffered data may be triggered based on the bits already received upon triggering of a "timeout" by the channel's card-present timer 1171/1172/1173 (e.g., when a period of no flux exceed the timer's timeout threshold, causing the bits already received to be processed), the number of bits loaded into the respective buffer reaching a threshold bit-count, and/or based on detection of the Start Sentinel.

In each channel decoder 631/632/633, the reception of a new pulse or decoding of a new bit may reset the card-present timer 1171/1172/1173. If the timer expires before the logic 1191/1192/1993 begins processing the decoded bits or a Start Sentinel for the respective channel is detected, the decoder logic 1191/1192/1193 for the respective channel may "timeout." However, a timeout does not necessarily trigger a transaction failure. Once a channel decoder times-out (e.g., Track 1 decoder 631), the decoder may stop receiving bits and decode data received prior to the timeout. This is particularly advantageous when the buffers 1151/1152/1153 are circular FIFO buffers that overwrite old data when full, since a timeout triggered in one channel can assure that the decoder will not lose any data from the beginning of a received magnetic pulse transmission (due to being overwritten by later data). For the channel(s) that does not timeout (such as a channel with a longer card-present time, like a Track 2 channel), that channel decoder will continue to receive bits and flush the data it receives at the beginning of the magnetic pulse stream (when the respective buffer overflows, overwriting old data), thereby overwriting data intended for a different channel prior to processing.

For example, with a T1-T2R sequence, processing of the T1 sequence by the Track 1 channel decoder 631 can be triggered by inserting a the time gap in the magnetic pulse transmission that exceeds the Track 1 card-present timer 1171 time limit $TO_1$ 1201, but that is less than the Track 2 card-present timer 1172 time limit $TO_2$ 1202. The Track 1 decoder 631 will decode the Track 1 data (in the T1-T2R transmission) that was received prior to the timeout, with data received after the timeout not being stored and/or processed. However, the Track 2 channel decoder 632 will continue receiving the Track 2 data (in T1-T2R). Due to the buffers being circular FIFO buffers, the Track 2 channel decoder 632 may flush data that was received at the beginning of the T1-T2R transmission (i.e., Track 1 data), rather than the needed Track 2 data. As a result, both the Track 1 channel decoder 631 and the Track 2 channel decoder 632 receive the track payloads for their respective tracks, producing "good" reads for those channels (which is the desired result). Furthermore, by causing the Track 3 decoder 633 to timeout prior to the Track 2 data, the Track 3 channel decoder 633 processes the received Track 1 data (in the 7-bits-per-character format 114a), resulting in an "error" read (which is the desired result). Thus, in MSRs that include read heads and decoders for all three channels, a "T2==T3" conflict can be avoided.

Figure 12:
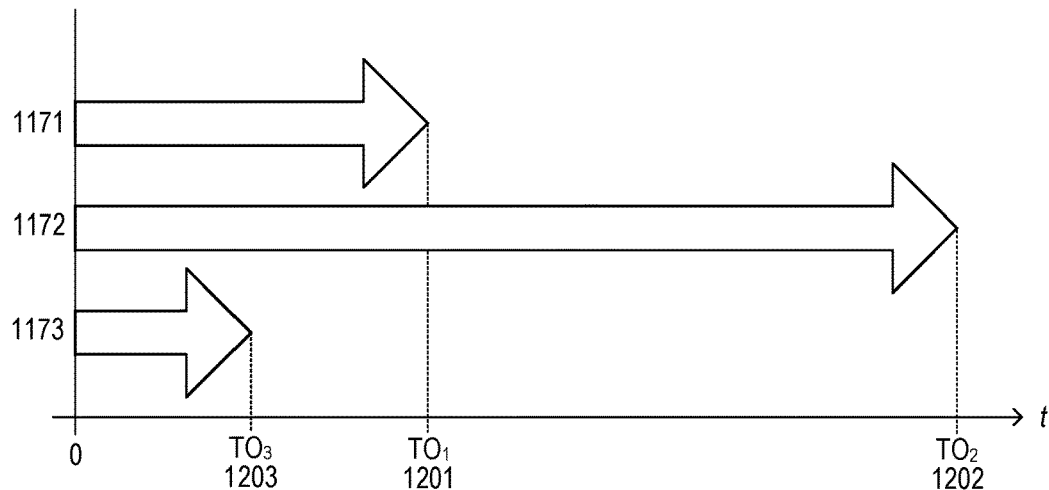
FIG. 12 illustrates examples of the channel tolerances for gaps between received data bursts in the receiver.

The time limits of the card-present timers 1171/1172/1173 that trigger a timeout of the respective decoder may be different for each channel. FIG. 12 illustrates examples of the time limits of the card-present timers, which corresponds to the channel decoder's tolerance for gaps in received signal. The card-present timer values may be based on the character/bit rate expected when a conventional magnetic stripe card 100 is swiped across the read heads 500, with each channel's timeout limit being based on the length of time to receive a single character in the respective channel format (e.g., recording density 113 and character configuration 114) times a non-zero positive integer (e.g., 1, 2, 10, etc.). The integer value depends upon POS terminal models, with different terminals using different integer values. In the illustrated example, the Track 3 channel has the shortest time limit $TO_3$ 1203, the Track 2 channel has the longest time limit $TO_2$ 1202, and the Track 1 channel has a time limit $TO_1$ 1201 in-between. A specific embodiment would be a time limit $TO_1$ 1201 of 2 milliseconds (ms) for Track 1, a time limit $TO_2$ 1202 of 5 ms for Track 2, and a time limit $TO_3$ 1203 of 1 ms for Track 3.

By introducing n-state trits into the data stream 611, the controller 702 can precisely control the exact length of gaps and their timing/location in the filtered signals 661/662/663. Using n-state trits, the controller 702 can introduce gaps within a track's data or between the data for different tracks. Within a track's data, n-state trits can be between characters (inter-character, referring to the characters comprising track information content 115), as well as mixed in with the "0" and "1" trits corresponding to the bits representing an individual character (intra-character, referring to the bits/trits representing an individual character of track information content 115). During the gaps produced by n-state trits, a magnitude of the emitted magnetic flux 629 drops to zero energy.

Referring to FIG. 12, the controller 702 may estimate the time limit for each channel's card-present timer based on the longest duration of time that it may take to transmit a single character in the respective character format times a non-zero integer, which is roughly the number of bits per character (114) divided by the slowest baud rate accepted by the channel's decoder 631/632/633 time the integer. The transmitter's controller 702 may determine baud rate information and the integer value based on a table or tables stored on the payment device 610. Such information may be updated, among other ways, by trial-and-error determinations of what rates and integer multipliers result in a completed transaction.

To leverage the card-present timers, the controller 702 may prioritize use of frameworks specifying how to order track data. The controller 702 may use different frameworks with different POS terminals and locations, and may try a series of frameworks at a location until one works. One way the controller 702 may prioritize is based on the timeout gap tolerances associated with the decoders for the respective channels specified in the framework (e.g, $TO_1$ 1201, $TO_2$ 1202, $TO_3$ 1203). For many decoders, the gap tolerances of card-present timers for each channel will be approximately equal to the longest duration it ordinarily takes to communicate a single character by card swipe times the non-zero integer value. To take advantage of this approach to generating a timeout, the controller 702 may prioritize (i.e., try) frameworks in which a slower character-rate channel (e.g., Track 2 102) occurs after a faster character-rate channel (e.g., Track 1 101, Track 3 103) ahead of frameworks where a faster character-rate channel follows a slower character-rate channel.

So for example, referring to the relative gap tolerances illustrated in FIG. 12, a controller 702 may prioritize a "T1-T2R" framework ahead of a "T2-T1R" framework, if both frameworks might otherwise be viable for the POS terminal at the location. With T1-T2R, the controller 702 may try to trigger a timeout in the Track 1 decoder 631 by inserting a continuous series of n-state trits after the Track 1 sequence of T1-T2R (inserted between T1 and T2R, or insert into the T2R sequence itself). In the same ternary data, the controller 702 may also intersperse n-state trits into the ternary data after the start of the Track 1 sequence and prior to the reversed Track 2 sequence in order to purge some or all of the Track 1 data from the Track 2 decoder's buffer 1152 (by overflowing the buffer(s) so as to overwrite the Track 1 data). If the T1-T2R transmission is unsuccessful, the controller 702 may try T2-T1R, interspersing n-state trits after the start of the T2R sequence and prior to the Track 1 sequence in T2-T1R in order to purge some or all of the Track 2 data from the Track 1 decoder's buffer 1151 (by overflowing the buffer(s) so as to overwrite the Track 2 data).

By employing framework prioritization, the controller 702 arranges track data sequences in the ternary data signal so that a decoder channel having a shorter timer threshold (e.g., 1201, 1202) will be ahead of track data sequences for a decoder channel having a longer timer threshold (e.g., 1203, 1201). This allows the transmitter 610 to trigger a timeout in the decoder channel having the shorter timer threshold prior to or while transmitting track data targeted at the decoder channel having the longer timer threshold.

To trigger the timeout in the first track's decoder, the controller 702 may insert a continuous series of n-state trits into the stream toward the beginning of the second track data, such as by inserting the series of n-state trits between zero and one trits representing the second track. As another option, the controller 702 can trigger a time-out in the first track's decoder by inserting the n-state trits into the ternary signal after the trits corresponding to the first track's data and before the trits corresponding to the second track's data.

While a framework or tables stored on the device 610 may specify timeout threshold values 1201/1202/1203 for the respective channels, the controller 702 may estimate the card-present timer thresholds (which correspond to the channel's gap tolerance) based on a character rate for each respective channel. For example, the controller 702 may estimate a first gap tolerance for a first channel decoder based on an amount of time to transmit a single character of data for that track at a baud rate used for first track transmissions times a non-zero integer value, and estimate a second gap tolerance for a second channel decoder based on an amount of time to transmit a single character of data for that track at a baud rate used for second track transmissions times the non-zero integer value. A margin value (e.g., +10%) may be added to increase the likelihood of triggering a timeout. The controller 702 may calculate the number of n-state trits to insert into the ternary data signal by multiplying the gap tolerance (e.g., in milliseconds) for the channel where a timeout is to be triggered, plus any margin (e.g., 10%), times the baud rate that will be applied to the continuous series of n-state trits at the time of transmission via the inductor 628.

Figure 13:
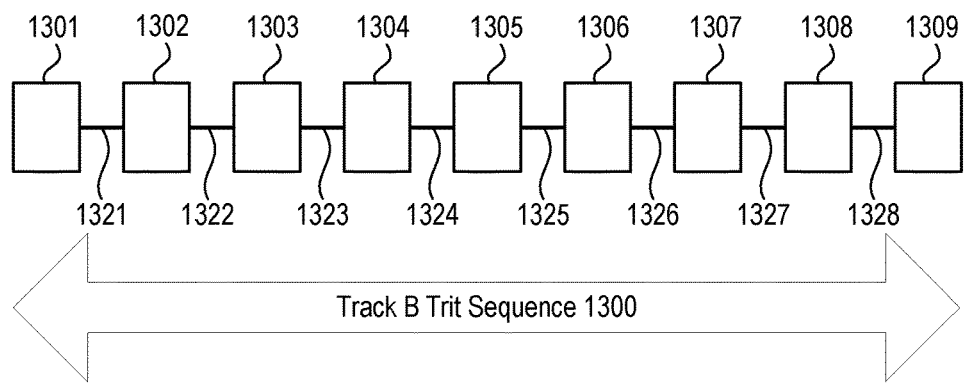
FIG. 13 illustrates an example of how n-states can be arranged in the midst of track data according to the system, process, and apparatus of the disclosure.

FIG. 13 illustrates an example of how the controller 702 arranges n-states in the midst of track data. Based on a framework, the controller 702 assembles the sequences in memory and transmits the assembled sequences as a ternary data signal to the logic 618/918, causing the MST 620 to emit the magnetic pulse stream. A trit sequence 1300 includes 0 and 1 trits corresponding to Track "B" (Track 1, 2, or 3) data, represented by elements 1301 to 1309. Interspersed between elements 1301 to 1309 are gaps 1321 to 1328 that cause the flux 629 to collapse to zero energy. Each gap comprises a full-cycle n-state, a fractional-cycle n-state (such as a half-cycle n-state "n/2" discussed further below), or a plurality thereof. Different gaps may have different durations. Gaps 1321 to 1328 may be arranged inter-character, intra-character, or some combination thereof.

By including a gap of a length below the card-present time limit of the track being transmitted or yet-to-be transmitted (e.g., Track B), but exceeding the timeout time limit for a channel whose data has already been emitted, a time-out can be induced in a channel decoder 631/632/633 that should already have received its intended track data, and is not the intended recipient of the trits being transmitted or yet to be transmitted.

Figure 14:
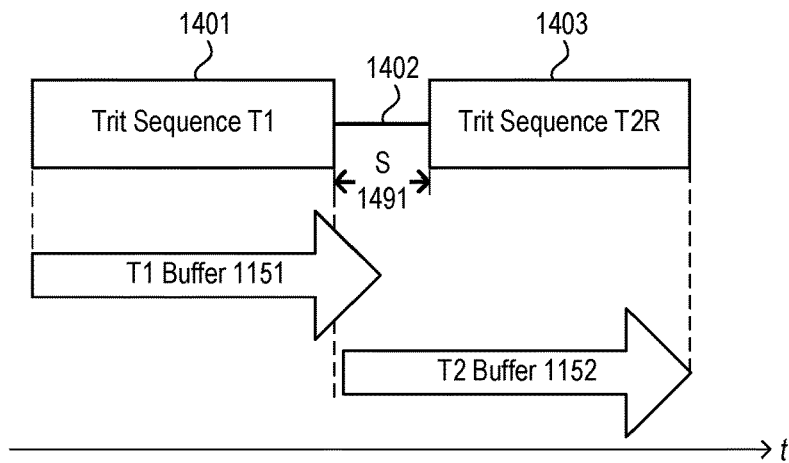
FIG. 14 illustrates an example of how n-state can be used to leverage differences in channel receiver buffer sizes according to the system, process, and apparatus of the disclosure.

FIG. 14 illustrates an example of how n-state can be used to leverage differences in buffer sizes of the channel receiver buffers 1151/1152/1153. The channel receiver buffers are ordinarily circular buffers with a capacity limit (e.g., FIFO buffers). When the buffer overflows, the oldest information is overwritten with new information. By inserting n-trits into the stream, one-or-more buffers 1151/1152/1153 can be selectively overflowed. By overflowing the buffer, data relating to other tracks can be flushed from the buffer prior to that channel's logic 1191/1192/1193 processing the received data for that channel.

The transmitted sequences in FIG. 14 comprise a Track 1 trits sequence 1401, a sequence of n-state trits 1402, and a reversed Track 2 (T2R) trit sequence 1403. The n-state trits 1402 create an inter-track gap having a duration S 1491. The gap 1491 occurs after the Track 1 buffer 1151 has received an entirety of the Track 1 sequence 1401. The duration S 1491 is sized so that the Track 1 trit sequence 1401 is flushed from the Track 2 buffer 1152 prior to the complete Track 2 sequence 1403 is received. The n-state trit sequence 1402 is smaller than the capacity of either the Track 1 buffer 1151 and Track 2 buffer 1152 individually. By the time the Start Sentinel 310 is received at the end of the T2R sequence 1403, all of the Track 1 sequence 1401 has been flushed from the Track 2 buffer 1152.

The controller 702 arranges the trits expressing first data (e.g., 1401) so that they occur in the ternary data signal ahead of the trits expressing the second data (e.g., 1402), with the trits expressing the first data being transmitted over a first duration of time that is shorter than the second duration of time required to transmit the trits expressing the second data. The controller 702 arranges a continuous series of third-state trits (e.g., 1402) so that they to occur in the ternary data signal after the trits expressing the first data and prior to the trits expressing the second data. The resulting gap in the emitted magnetic flux has the duration S 1491. The length of the duration S 1491 is sized so that a sum of the first duration for transmitting the first trit sequence (e.g., 1401, including any inserted n-state trits interspersed in the Track 1 data) and the gap S 1491 exceeds the amount of time to fill the Track 2 channel buffer 1152.

The objective is to cause the channel buffer (e.g., T2 buffer 1152) for the second channel to be completely flushed of data corresponding to the first channel before the end of the second channel sequence is received. This is particularly advantageous when the data for the second channel is sent in reverse bit-order, such that some or all of the first channel data will be flushed from the second channel buffer before the second channel start sentinel is processed.

The approach illustrated in FIG. 14 can be used with any combination of tracks, but is particularly advantageous for avoiding a "T2==T3" conflict. This conflict may occur, for example, when the POS terminal is a Verifone MX9XX pinpad. Using the illustrated T1-T2R example, the Track 1 channel buffer 1151, the Track 2 channel buffer 1152, and the Track 3 channel buffer 1153 would have the same start time. The Track 2 channel buffer 1152 again has an effective end point coinciding with the last trit of the T2R trit sequence 1403, and a start position anywhere between the start point of the Track 1 trit sequence 1401 and the end of the gap 1402. To avoid the "T2==T3" conflict, the gap duration S 1491 should be longer than the Track 1 card-present timer 1171 time limit $TO_1$ 1201, longer than the Track 3 card-present timer 1173 time limit $TO_3$ 1203, and shorter than the Track 2 card-present timer 1172 time limit $TO_2$ 1202. When the gap duration S 1491 is longer than the threshold time limit of a respective track channel decoder, that buffer will timeout, such that the Track 3 channel decoder 633 will timeout prior to transmission of the T2R trit sequence 1403. Meanwhile, the gap S 1491 will purge some or all of the Track 1 data from the Track 2 channel buffer 1172, prior to the Track 2 Parser 682 processing the received T2R data. The result will be a "good" read in the Track 1 channel, a "good" read in the Track 2 channel, and an "error" read in the Track 3 channel (the desired outcome). Trit sequence T1 1401 (that is, Track 1 information content 115 in a forward-bit-order) could be replaced with a T1N trit sequence, where T1N is shorter than T1, while still having the benefits of resolving "T2==T3."

Figure 15:
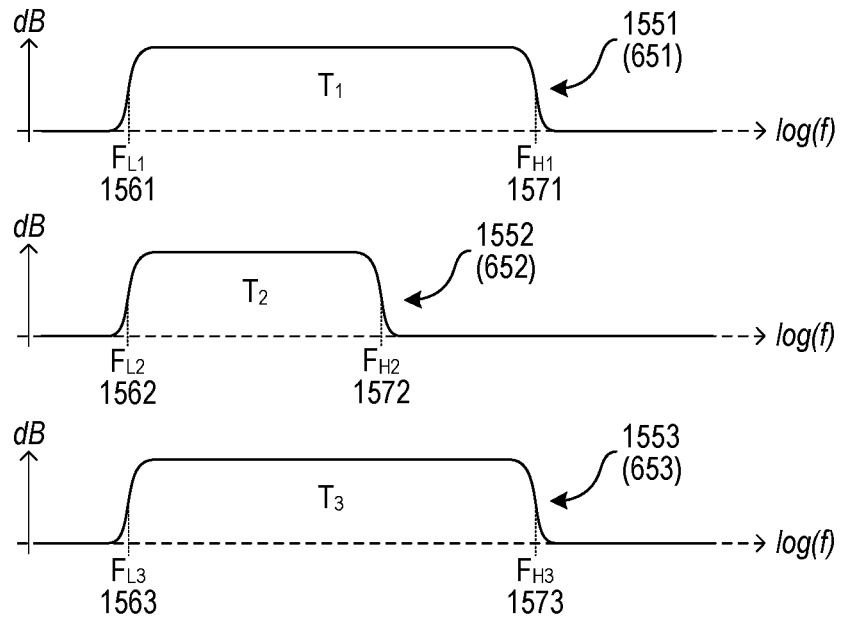
FIGS. 15 and 16 illustrate examples of the frequency filtering characteristics of the MSR's decoders in FIG. 6.
Figure 16:
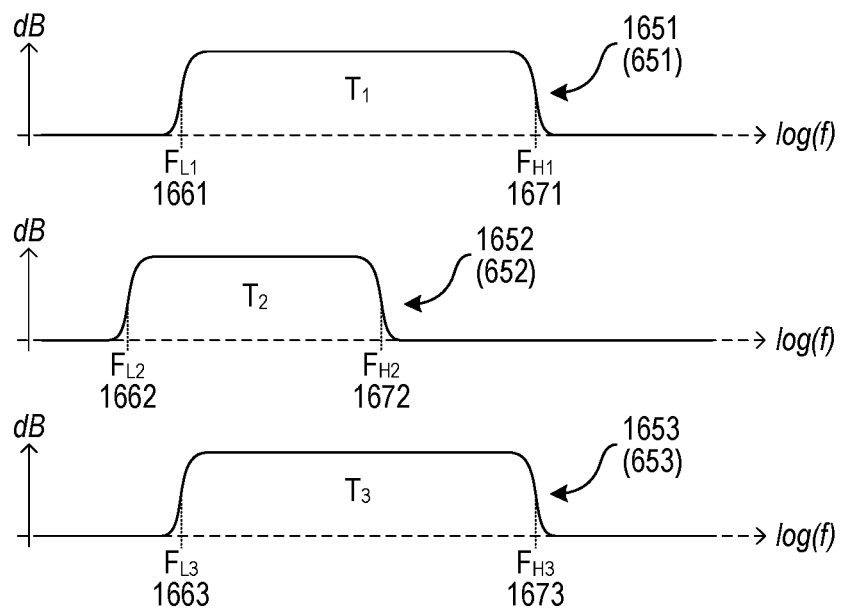

FIGS. 15 and 16 illustrate examples of the frequency-response filtering characteristics of the MSR's channel decoders 631, 632, and 633. Differences between the read heads 501/502/503, filters 651/652/653, and any intervening amplifiers (not illustrated) may each contribute to a channel's frequency response characteristics. However, for the purpose of explanation, the channel filtering characteristics will be attributed to the filters 651, 652, and 653. The type of filters included in MSRs may vary from channel-to-channel, and from model-to-model. Among other purposes, the filters 651/652/653 may be used to attenuate high frequency noise and dampen harmonics generated by the read heads 500 during a conventional card-swipe transaction. Reducing high frequency noise increases the effective resolution of Analog-to-Digital Converters 670 and aids in the detection of smaller read head signals.

The filters 651, 652, and 653 may be low-pass or bandpass filters. For the purpose of explanation, the filter magnitude transfer functions in FIGS. 15 and 16 are illustrated for bandpass filters using Full Width at Half Maximum (FWHM) low and high cutoff frequencies. In essence, a low pass filter can be thought of as a bandpass filter with a pass band that starts at zero Hertz.

In the example in FIG. 15, the magnitude transfer functions 1551, 1552, and 1553 of the filters 651, 652, and 653 have substantially the same low-end cutoff frequencies $F_{L1}$ 1561, $F_{L2}$ 1562, and $F_{L3}$ 1563, below which the respective filters attenuate signals, and above which signals pass in the passband. However, the high-end cutoff frequencies above which the filters attenuate signals vary. The Track 1 channel filter 651 has a high-end cutoff frequency $F_{H1}$ 1571. The Track 2 channel filter 652 has a high-end cutoff frequency $F_{H2}$ 1572. The Track 3 channel filter 653 has a high-end cutoff frequency $F_{H3}$ 1573. As illustrated, $F_{H1}$ 1551 and $F_{H3}$ 1553 are greater than $F_{H2}$ 1552.

In the example in FIG. 16, the magnitude transfer functions 1651, 1652, and 1653 of the filters 651, 652, and 653 have different low-end and high-end cutoff frequencies. The Track 1 channel filter 651 has a low-end cutoff frequency $F_{L1}$ 1661 and a high-end cutoff frequency $F_{H1}$ 1671. The Track 2 channel filter 652 has a low-end cutoff frequency $F_{L2}$ 1662 and a high-end cutoff frequency $F_{H2}$ 1672. The Track 3 channel filter 653 has a low-end cutoff frequency $F_{L3}$1663 and high-end cutoff frequency $F_{H3}$ 1673. As illustrated, $F_{L2}$ 1662 is lower than $F_{L1}$ 1661 and $F_{L3}$ 1663, and $F_{H1}$ 1651 and $F_{H3}$ 1653 are greater than $F_{H2}$ 1652.

In the examples in FIGS. 15 and 16, the filter characteristics of the Track 1 channel are substantially the same as those of the Track 3 channel, as may sometimes be the case. However, the Track 1 and Track 3 filtering characteristics are independent of each other.

The controller 702 may determine high-end cutoff frequency $F_H$ and low-end cutoff frequency $F_L$ for a channel decoder based on a table or tables stored on the payment device 610, and/or based on information included in a framework. Such information may be updated, among other ways, by trial-and-error determinations of what rates result in a completed transaction. The low-end cutoff $F_L$ of a channel decoder's filter 651/652/653 may correlate with the slowest baud rate accepted by the channel's decoder 631/632/633, and the high-end cutoff $F_H$ of a channel's decoder's filter 651/652/653 may correlate with the fastest baud rate accepted by the channel's decoder 631/632/633. As such, the controller 702 may approximate a channel's card-present timer time limit (TO in FIG. 12) based on the channel filter's $F_L$ value.

By manipulating the baud rate of the trit stream, the controller 702 can create gaps in the filtered signals 661/662/663 in the receiver. If the gap time is sufficiently long to trigger a timeout (by timers 1171/1172/1173), the parser 681/682/683 of that channel will process the bits buffered after to the timeout, while ignoring data received thereafter.

Modulating the transmission baud rate of the data for each channel can improve reception of multi-channel streams. The baud rates are modulated to leverage differences in the analog-signal handling characteristics between channels in conventional MSRs. By manipulating the transmission baud rate and the rate of change in the baud rate, the data for a first channel can be made more likely to appear as noise to a second receiver channel, or to be substantially filtered out prior to decoding.

With a serial multi-channel magnetic pulse stream from the device 610, the MSR decoders must successfully detect data for their respective channel in the stream. To facilitate successful processing by the MSR 630, existing techniques have focused on the arrangement of track data in the serial magnetic pulse stream, and the digital content included within the track data itself. Also, Track 2 data might be transmitted in the stream at a lower baud rate than Track 1 and/or Track 3, so as to simulate the difference in baud rate that would occur during the swipe of a physical magnetic card stripe 11, since the recording density 113*b* associated with the Track 2 102 is less than the recording densities 113*a*/113*c* associated with Track 1 101 and Track 3 103. However, changes in baud rate within the serial stream were designed to make track data more susceptible to detection by a corresponding track decoder, rather than to decrease the susceptibility of detection of the data to the other track decoder(s).

The device 610 may leverage differences in analog-signal handling between MSR channels in order to make serial data intended for a first track decoder appear to as noise to a second channel's decoder. The device 610 modulates the baud rate within a portion of the stream corresponding to a first track. The baud rate modulation and/or the rate of change of baud rate modulation is designed to be within the analog-signal handling tolerances of the intended decoder, while being incompatible with the analog-signal handling tolerances of one-or-both of the other decoders. The transmission baud rate and relevant thresholds depend in-part on how track data is arranged in the serial pulse stream, but are also manipulated or compensated for as a function of parameters associated with an MSR 630 of a particular POS terminal or terminal type. Parameter-based thresholds include those based on the frequency response of each channel decoder of an MSR, a channel decoder's tolerance for the rate of change in the transmission baud rate, and a channel decoder's card-present timeout threshold.

Figure 17:
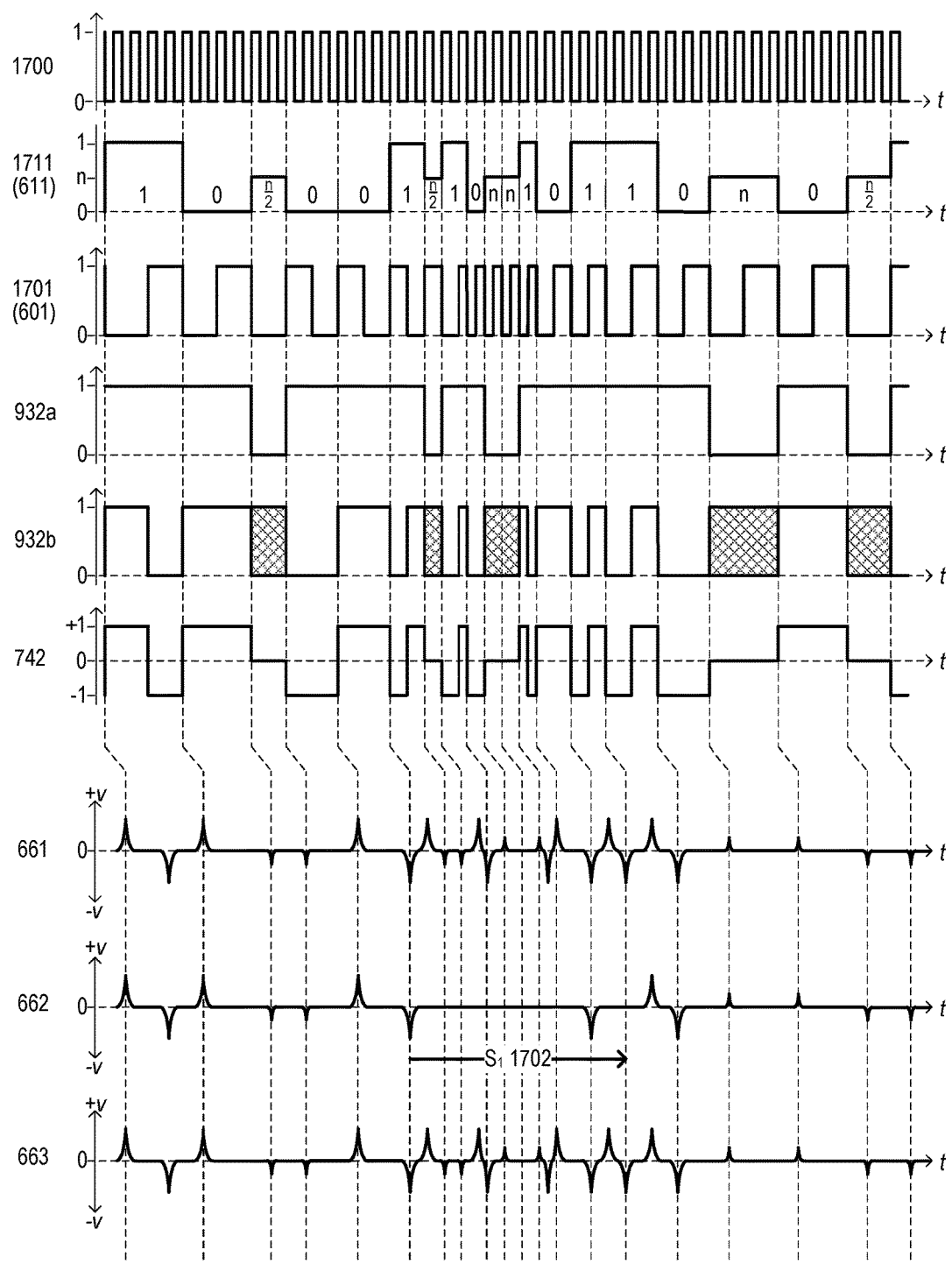
FIG. 17 is a timing diagram illustrating an example of how n-states can be used to manipulate the effective baud rate of the data transmitted data according to the system, process, and apparatus of the disclosure.

FIG. 17 is a timing diagram illustrating an example of baud-rate manipulation, leveraging differences in the high-end cutoff frequencies $F_H$ between channels, in filters such as those in FIGS. 15 and 16. In this example, the F2F encoder 741 is integrated into the transmitter's controller 702, with logic 918 receiving an F2F-encoded ternary sequence 932. In FIG. 17, signal 1700 represents a clock rate of the bus 714. The signal 1711 corresponds to the ternary signal 611 input into the F2F encoder 741 integrated into the controller 702, or if encoding is emulated in software or the data is stored in an encoded format, the ternary signal being simulated by the controller 702.

The controller 702 may arrange some or all of the n-state trits in the track data 1711 to encode additional information. The signal 1711 includes "0" trits and "1" trits with "n" trits and "n/2" trits interspersed therebetween. Each "0" and "1" trit represents bits of a character of card track data. Each "n" trit has an effective duration equal to that of a "0" or "1" trit. Each "n/2" trit has an effective duration that is one-half that of a "0" or "1" trit. Since n and n/2 trits result in emitted flux 629 dropping to zero energy, the baud rate of reach n and n/2 trit is not important so long as consecutive trits produce a continuous gap of suitable length. However, n/2 trits are particularly useful when added intra-character to extend the overall length of a track sequence, and are also useful when encoding additional data into the stream using inverse-Morse code (e.g., a single n/2 trit to serve as a "dot" of a Morse-style dot-dash encoding, and two or more sequential n/2 and/or n trits to serve as a "dash"), where the duration and length of each gap is controlled so that a series of two-or-more gaps (interspersed between zero and one trits) may be used to represent a discrete piece of the additional information (e.g., an alphanumeric character). The inverse-Morse encoding may include a fixed number of zero and one trits between each pair of n-trits signifying a dot or dash (e.g., a single "zero" or "one" trit), and a fixed number of zero and one trits between each letter or symbol of dot-dash encoded additional information (e.g., three trits). Similarly, the n-state trits can be arranged among zero and one trits to replicate a barcode pattern. The controller 702 may add a fixed-length hash function tag or checksum (also encoded using n and n/2 trits) to the additional data to enable the receiver to detect errors in the additional data.

The controller 702 may integrate the n-state trits corresponding to the additional data in the midst of track data in the manner illustrated in FIG. 13. As such, the n-state trits may contribute to the trits added to track data to overflow one-or-more of the channel receiver buffers 1151/1152/1153 associated with another channel, and may extend into interstitial F2F-encoded bits between sequences corresponding different tracks 101/102/103, such as F2F-encoded clocking bits.

Signal 1701 represents the effective clock rate embedded into the F2F-encoded signal 932, corresponding a variable-rate version of the clock signal 601. As discussed in connection with FIG. 9, the bit signal 932*a* indicates n and n/2 states, with the difference in duration between n and n/2 trits dependent upon the effective clock rate 1701. Symbolically, a same state of the bit signal 932a represent both the n and n/2 states. The bit signal 932b represents the F2F-encoded data, with the spacing between transitions corresponding to each bit conveying the effective clock rate to the MSR 630. The resulting variable-baud output signal 742 includes both n-trits and n/2 trits embedded between the 0 and 1 trits conveying bits of the track data.

By varying the baud rate of the emitted signal, corresponding to the variable effective clock rate 1701, the transmitted signal can be modified to cause one MSR channel receiver to process the signal while causing another to ignore it.

For example, by increasing the transmission baud rate during the period $S_2$ 1702, a substantial portion of a Track 1 or Track 3 transmission in the serial stream will not be processed by the Track 2 parser 682, and/or ignored as background noise, even though the magnetic flux Φ 629 containing the Track 1 or 3 transmission is received by all three read heads 501/502/503.

Initially, prior to the period $S_2$ 1702, the baud rate results in the signal having a frequency within the passband of all three channel filters 651/652/653. During the period $S_2$ 1702, the effective clock rate 1711 increases to cause the frequency of the emitted magnetic pulses 629 to induce pulses in the Track 1 read head 501 that have a frequency below the high-end cutoff frequencies $F_{H1}$ 1571/1671 of the Track 1 filter 651 and $F_{H3}$ 1573/1673 of the Track 3 filter 653. However, the induced pulses in the Track 2 read head 502 have a frequency above the high-end cutoff frequency $F_{H2}$ 1572/1672 of the Track 2 filter 652, resulting in a substantial attenuation of pulses in the filtered signal 662 for the duration of the period $S_2$ 1702. Thereafter, the effective clock rate 1701 and corresponding baud rate at track data is transmitted returns to below all the high-end cutoff frequencies $F_H$ of all three channel filters.

Referring back to the magnitude transfer functions 1651, 1652, and 1653 of the filters 651, 652, and 653 in FIG. 16, gaps can similarly be introduced into MSR's filtered signals 661/662/663 by lowering the effective clock rate 1711 (corresponding to the track data baud rate) below the frequency cutoff of one or more filters. For example, the baud rate can be reduced so that the pulses of the portion of the data stream including the Track 2 data produces a signal above the low-end cutoff frequency $F_{L2}$ 1662 of the Track 2 filter 652, but below the low-end cutoffs frequency $F_{L1}$ 1661 and $F_{L3}$ 1663 of the Track 1 filter 651 and Track 3 filter 653. The result is that the signals from the Track 1 read head 501 and Track 3 read head 503 will be substantially attenuated by the Track 1 and Track 3 filters 651/653, while the signal from the Track 2 read head 502 is transmitted through the filter 652 substantially un-attenuated.

Figure 18:
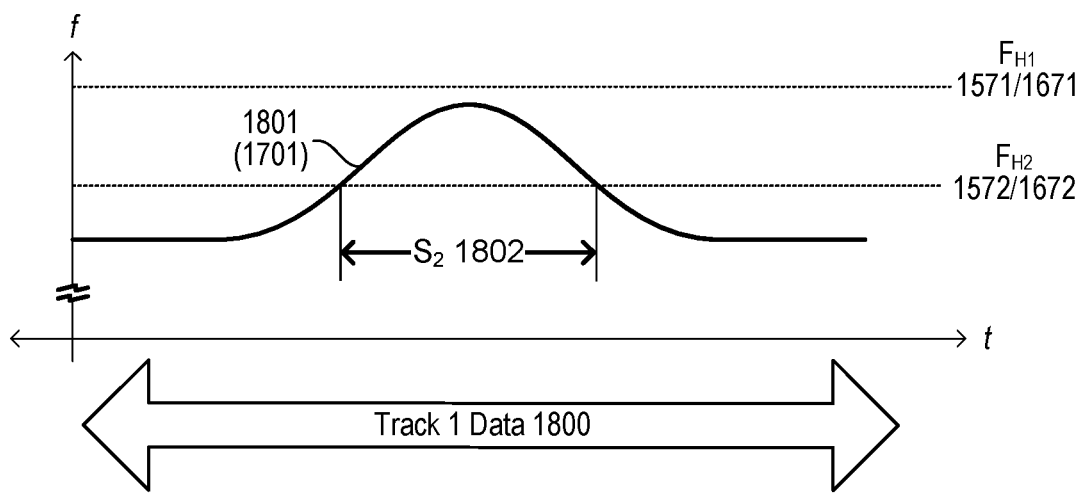
FIGS. 18 and 19 illustrate examples of how the baud rate may be manipulated relative to the frequency responses of the MSR's filters according to the system, process, and apparatus of the disclosure.
Figure 19:
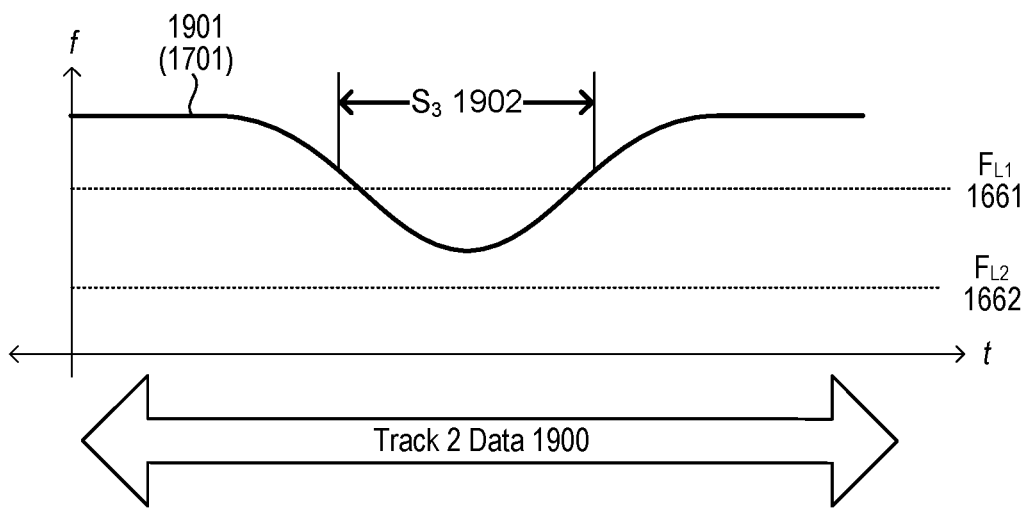

Sharp, abrupt changes in baud rate (e.g., discontinuously changing baud rate between two data non-n trits) may work with certain MSRs. However, when changing the baud rate, it may be desirable when transmitting to certain MSRs to change the frequency gradually over a plurality of data trits. FIGS. 18 and 19 illustrate examples of how the baud rate may be gradually changed relative to the frequency responses of the MSR's filters.

The frequency curve 1801 in FIG. 18 illustrates a gradual increase in the effective clock rate 1701 from a first frequency to a second frequency over a plurality of bits/trits, followed by a gradual decrease back to the first frequency. The change in the effective clock 1701 frequency corresponds to a change in the baud rate at which individual bits of track data are transmitted. Initially, the frequency is below the Track 1 filter high-end frequency cut-off $F_{H1}$ 1571/1671 and the Track 2 filter high-end frequency cut-off $F_{H2}$ 1572/1672. The frequency gradually rises above $F_{H2}$ 1572/1672 while staying below $F_{H1}$ 1571/1671, stabilizes, and then gradually declines back below $F_{H2}$ 1572/1672. During the period $S_2$ 1802 during which the effective clock rate 1701 is above $F_{H2}$ 1572/1672, the signal from the Track 2 read head 502 is substantially attenuated by the Track 2 filter 652, while the signal from the Track 1 read head 501 is transmitted through the filter 651 substantially un-attenuated.

The frequency curve 1901 in FIG. 19 illustrates a gradual decrease and increase in the effective clock rate 1701 from a first frequency to a third frequency over a plurality of data bits/trits. The change in the effective clock 1701 frequency corresponds to a change in the baud rate at which individual bits of track data are transmitted (as 0 and 1 trits). Initially, the frequency is above the Track 1 filter low-end frequency cut-off $F_{L1}$ 1661 and the Track 2 filter low-end frequency cut-off $F_{L2}$ 1662. The frequency gradually declines below $F_{L1}$ 1661 while staying above $F_{L2}$ 1662, stabilizes, and then gradually increases back above $F_{L1}$ 1661. During the period $S_3$ 1902 during which the effective clock rate 1701 is below $F_{L1}$ 1661, the signal from the Track 1 read head 501 is substantially attenuated by the Track 1 filter 651, while the signal from the Track 2 read head 502 is transmitted through the filter 652 substantially un-attenuated.

FIGS. 20 and 21 illustrate examples of how the rate of change in the baud rate may be used to differentiate channels. The frequency curve 2001 in FIG. 20 illustrates a gradual increase in the effective clock 1701 from a first frequency to a second frequency over a plurality of track data trits 1711 (i.e., zero and one trits), followed by a gradual decrease back to the first frequency, while data 2004 for a first track (Track "X") is being transmitted. The frequency curve 2101 in FIG. 21 illustrates a gradual decrease and increase in the effective clock 1701 from a first frequency to a third frequency over a plurality of track data trits 1711, followed by a gradual increase back to the first frequency, while data 2105 for a second track (Track "Y") is being transmitted.

Each of the channel decoders 631, 632, and 633 may have a different tolerance for the rate of change of the baud rate. These tolerances may depend in part on the ability of the clock regenerator in the F2F decoders 1161, 1162, and 1163 to adjust to changes in the duration corresponding to each decoded bit of track data, as determined based on the edge transitions in the received data stream. A failure to track changes to the clock frequency may cause the F2F decoders to misconstrue an F2F-encoded binary one to be decoded as two binary zeros, to misconstrue two F2F-encoded zeros to be decoded as one binary one, and/or to trigger a timeout while the clock generator reestablishes bit-timing. The rate of change corresponds to the 1st derivative of the frequency change function. The 1st derivative of the frequency change function is the slope of a line tangent to that function.

In FIG. 20, the peak rate of change $\Delta_{UX}$ that a first decoder can tolerate as the effective clock frequency 1701 gradually rises (subscript "U" for up) from the first baud rate to the second baud rate is illustrated by the tangent line 2016 (having a positive slope value). The peak rate of change $\Delta_{DX}$ that the first decoder can tolerate as the effective clock frequency 1701 gradually descends (subscript "D" for down) from the second baud rate to the first baud rate is illustrated by the tangent line 2017 (having a negative slope value).

In FIG. 21, the peak rate of change $\Delta_{DY}$ that a second decoder can tolerate as the effective clock frequency 1701 gradually decreases from the first baud rate to the third baud rate is illustrated by the tangent line 2118 (having a negative slope value). The peak rate of change $\Delta_{UY}$ that the second decoder can tolerate as the effective clock frequency 1701 gradually increases from the third baud rate to the first baud rate is illustrated by the tangent line 2119 (having a positive slope value).

The magnitude of the positive slope $\Delta_{UX}$ 2016, negative slope $\Delta_{DX}$ 2017, negative slope $\Delta_{DY}$ 2118, and the positive slope $\Delta_{UY}$ 2119 may all be different, such that decoders may have different sensitivities to the rate of change as the baud rate increase and as the baud rate decreases, and differences across channels.

By increasing the baud rate during transmission of track data intended for a Track "A" channel faster than a Track "B" channel decoder can handle, a timeout can be triggered in the Track "B" channel decoder. Likewise, by decreasing the baud rate during transmission of track data intended for Track "A" faster than a Track "B" channel decoder can handle, a timeout can be triggered in the track "B" channel decoder. As previously discussed, a timeout results in the respective channel decoder processing data buffered prior to the timeout, while ignoring data received after the timeout.

This method of triggering channel decoder timeouts can be used in conjunction with changing the baud rate to generate pulses from the read heads 500 that are outside the passbands of the channel filters 651/652/653 (as discussed in connection with FIGS. 17-19), in conjunction with triggering time-outs and buffer overflow using n-trits, or can be used on its own.

Also, by combining a gap in a filtered channel signal (e.g., $S_1$ 1702 $S_2$ 1802, $S_3$ 1902) produced by baud-rate frequency modulation with a gap generated by n-states, a channel receiver experiencing the combined gap can be forced to time-out when the combined gap exceeds the channel's timeout threshold 1201/1202/1203. When combining timeouts in this manner, the controller 702 may give priority to frameworks that arrange the track data for longer timeout threshold channels after the data for a track channel with a shorter timeout threshold. Similarly, these approaches to triggering timeouts can be used individually or in combination with approaches to cause a buffer overflow in the decoder, since the different approaches may have different efficacies with different POS terminals. By mixing approaches, a single framework can be combined with a plurality of approaches to selectively trigger timeouts and buffer overflows.

By managing the length of the durations $S_1$ 1702, $S_2$ 1802, and $S_3$ 1902 generated by baud rate frequency modulation and the duration and spacing of gaps created by n-trits in the data stream, the transmitter 610 can selectively cause an MSR decoder to timeout after data for that decoder has been transmitted, while avoiding processing of some or all of the track data directed to a different MSR decoder. At a track data level, these ternary-coding and effective frequency manipulation techniques can be used with frameworks specifying track data sequences such as T1, T2, T3, T1N, T2N, T3N, and their reverse variants. Example compound sequences are T2-T2R, T2-T1NR, T2-T1R, T1N-T2, T1N-T2R, T1N-T2-T1R, T2-T1N-T2R, and T2-T1R-T2R.

Figure 22:
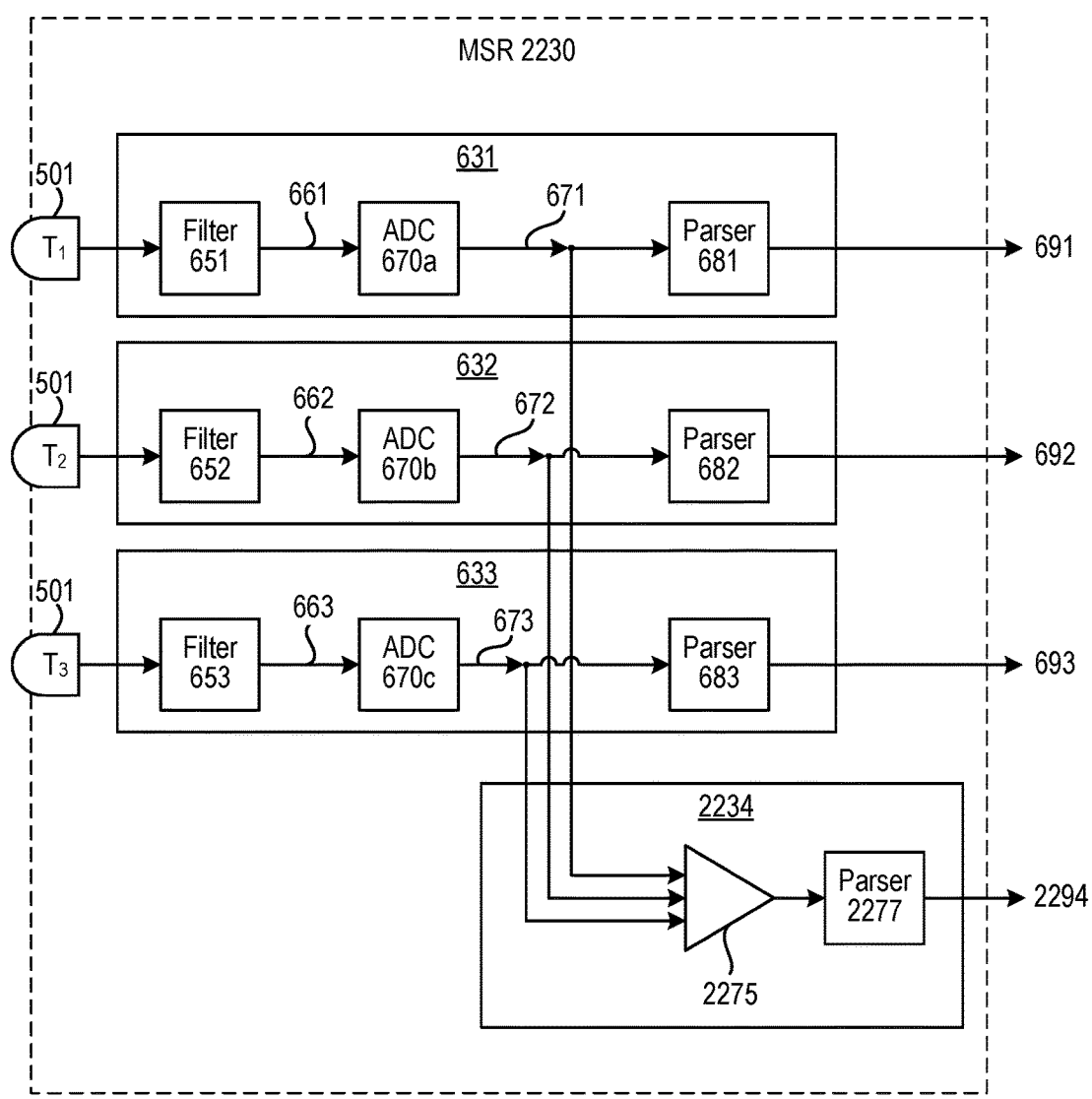
FIG. 22 is a block diagram illustrating an improved MSR that can extract information based on the arrangement of n-states in the received signal according to the system, process, and apparatus of the disclosure.

FIG. 22 is a block diagram illustrating an improved MSR that extracts additional information based on the arrangement of at least some of the n-states in the received signal. A decoder 2234 is added to the channel decoders 631/632/633. The decoder 2234 includes an adder circuit 2275 that combines either the analog or digital signals received by the channel decoders 631/632/633, outputting the combine signal to a parser 2277. The parser identifies gaps in the combined received signal, and processes the gap pattern to determine whether the arrangement and length of received gaps matches associated characters as a kind of inverse-Morse code, or with an on-off pattern to replicate a barcode pattern. The received characters/codes are output (2294) to the improved POS terminal. Such characters may be used for payment or non-payment purposes. A fixed-length hash function tag or checksum may be included in the steganographic message, and used by the parser 2277 to detect errors in the additional data.

Figure 23:
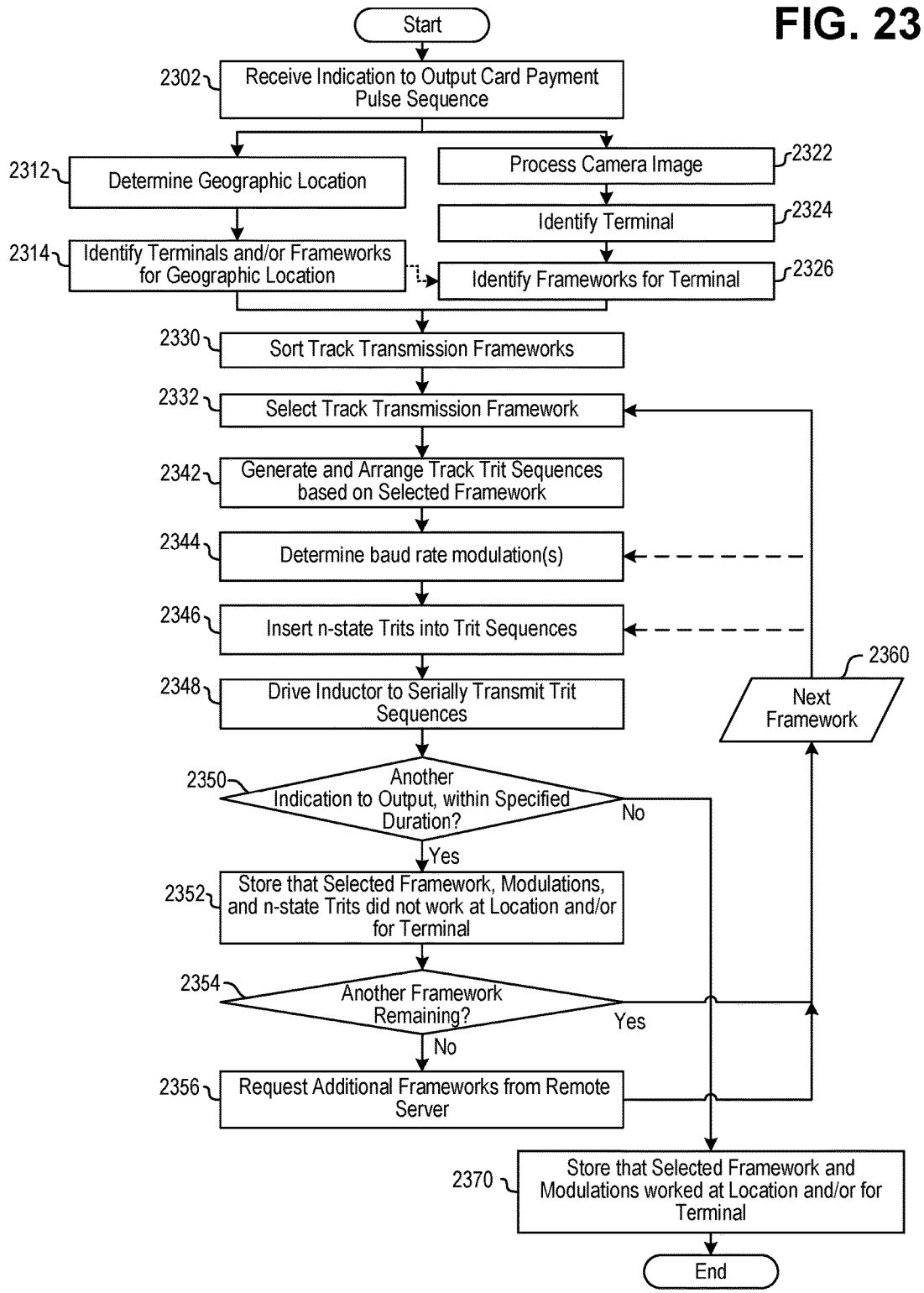
FIGS. 23 to 25 are process flow diagrams of a method according to the disclosure.
Figure 24:
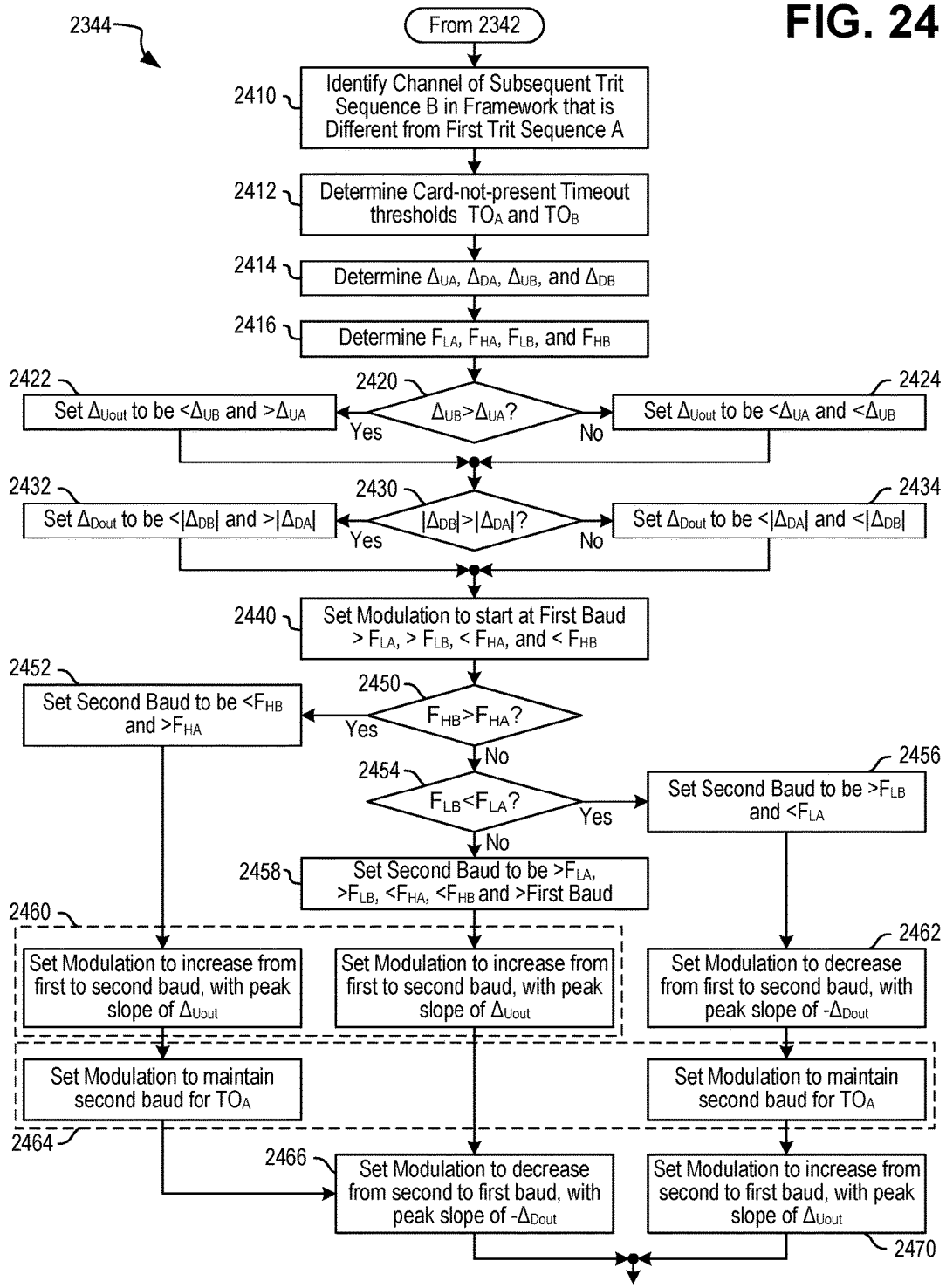
Figure 25:
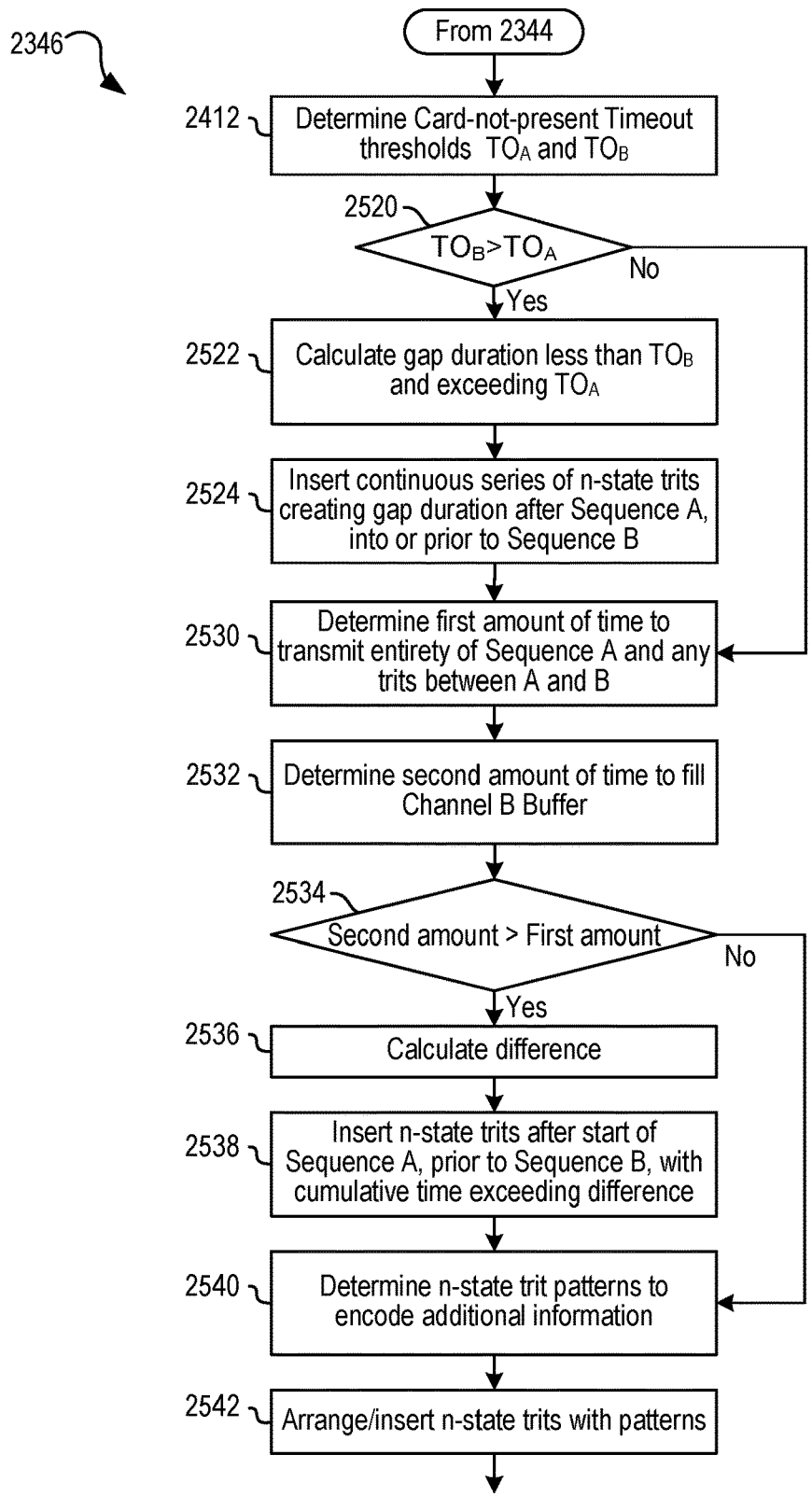

FIGS. 23 to 25 are flow diagrams illustrating an example of the contactless electronic payment system implemented as a method.

FIG. 23 illustrates an example of the process executed by the contactless payment device 610 to generate trits sequences and transmit those sequences as the ternary data signal (and resulting stream of magnetic pulses). The contactless payment device 610 receives (2302) an indication to output a magnetic stripe pulse sequence. Examples of receiving the indication is detecting a "touch" of a region of a graphical user interface (GUI) on touch-sensitive display that corresponds to a "pay" button, or actuation of a physical "pay" button.

The controller 702 of the contactless payment device 610 determines (2312) its geographic location. Any technique may be used to acquire location information, such as using information from satellite geographic positioning system receiver such as a Global Positioning System (GPS) receiver and/or a Global Navigation Satellite System (GLONASS) receiver. Other examples of how location information may be acquired include using other radio sources (e.g., via at least one antenna), such as mapping services that triangulate off of known WiFi service set identifiers (SSIDs) or cellular towers within range of the device 610.

The device 610 may also capture one or more images using a camera of the device 610, and process (2322) the image(s) captured by the camera to identify patterns in the captured image (or images) to identify (2324) whether any of the identified patterns correspond to that of a specific type of POS terminal. For example, the "Square" mag-reader dongle made by Square, Incorporated, has a distinctive shape that is identifiable using conventional image pattern recognition. In addition, some POS terminals have distinctively shaped features such as the shape of the pin/keypad.

Certain manufacturers and types of POS terminals may be known to predominate in certain geographic regions/countries. Using information stored on the device and/or by accessing a database over a wireless network, the controller 702 of the device 610 may identify (2314) pulse-transmission-sequence frameworks and/or terminal types for the geographic location and/or identify (2326) pulse sequence frameworks for the identified terminal.

The device 610 stores a list of pulse-transmission-sequence frameworks. Frameworks specify how to structure the transmission stream, such as indicating to use T2-T1R, T2-T1R-T2R, T2-T1NR, etc. A framework may include other information rules, and parameters, such as whether to include clocking bits/trits before and/or after a track sequence, identifiers for POS terminal types associated with the geographic location, and information about default baud rate modulations. Other information may be stored on the device in tables or a database indexed by location, terminal type, and/or other indicia that can be cross-referenced against the information included in the frameworks. Such tables may include values such as card-present timer limits for respective channels (as discussed with FIG. 12) or the integer multiplier to use to determine the timer limits, buffer capacities (as discussed with FIG. 14), low-end cutoff frequencies $F_L$ and high-end cutoff frequencies $F_H$ for respective channels (as discussed with FIGS. 15 and 16), and baud rate-of-change tolerances for respective channels (as discussed with FIGS. 20 and 21). Such values may also be included within a selected framework itself.

The controller 702 retrieves track data needed to assemble the trit sequences specified in a selected framework from memory. The controller 702 generates and assembles trit sequences using the stored magnetic stripe track data, and determines the baud rate modulation(s) to be used with respective sequences. For example, if a framework specifies to use T2-T1R-T2R, the device 610 will generate a first F2F-encoded pulse sequence from the Track 2 data stored for a selected payment card, will generate a second F2F-encoded pulse sequence from the Track 1 data for the selected payment card in reverse bit-order, and will generate a third F2F-encoded pulse sequence from the Track 2 data for the selected payment card in reverse bit-order.

Each framework may be associated with a weighted score corresponding to a confidence level that the sequence will or will not work at the geographic location and/or with the specific terminal. The controller 702 sorts (2330) the identified frameworks in accordance with sets of rules. The rules may give highest priority to frameworks that are indicated as working at the specific geographic location and/or with a specific identified terminal. Frameworks indicated as working within the region (e.g., a country), but untested at the specific location and/or with the specific identified terminal, may be given next-highest priority. Frameworks known not to work at the specific geographic location and in the regions and/or with the specific identified terminal may be given lowest priority. Among frameworks given the lowest priority, if the associated weighted confidence score fails to satisfy a stored threshold value, those frameworks may be culled from the sorted list as being unlikely to work. Frameworks indicated as working within the geographic region, but not at the specific geographic location and/or with the specific identified terminal, may be given next-to-last priority.

The controller 702 may further sort frameworks to prioritize the frameworks based on the order of track sequences to facilitate a controlled triggering of decoder timeouts and buffer overflows. For example, as will be described further in connection with FIG. 25, the controller 702 may determine a card-present timeout $TO_A$ associated with decoders for a first track sequence "A" specified by a framework, and determine a card-present timeout $TO_B$ associated with decoders for a second track sequence "B" specified by the respective framework, where A and B are different channels, and A will precede B in the ternary data. By prioritizing frameworks where $TO_A$ is shorter (less) than $TO_B$ ahead of other frameworks, there are more options available for triggering a timeout of the A channel decoder using baud rate modulation and/or n-state induced gaps in the signal. Thus, if two frameworks have similar weighted scores, the controller 702 can further order them based on $TO_A$ and $TO_B$.

Some frameworks may retain their default ordering in the list if they have not been tested. The default ordering may be based on, among other things, each framework's "success" rate in other geographic regions or overall. The list of candidate pulse transmission frameworks, their default ordering, and the individual or combined weighted scores indicating which sequences do and do not work at the location and within the region and/or with a specific POS terminal type may be reconciled between the contactless payment device 610 and a database on a remote server, either as part of the transaction process or as part of occasional updates.

In the absence of geographic location information and terminal type information, rules on the device 610 may configure the controller 702 to give priority to the last frameworks used by the device that worked, and may sort the rest of the frameworks based on their weighted confidence score. By rule, the list may be limited to a specific number of frameworks, such as limited to three-to-five frameworks having the highest (best) weighted scores. The list may also be limited to frameworks that have weighted scores exceeding a threshold value.

Based on the ordered priority, the contactless payment device 610 selects (2332) a framework, retrieves the needed track data from storage, generates (2342) trit sequences for each track specified by the selected framework, arranges the generated sequences in memory, determines (2344) baud rate modulations for one-or-more of the track sequences, inserts (2346) n-state trits into the stored trit sequences after a beginning and before an end of the zero and one trits of the stored trit sequences, and encodes the sequences, serially inputting the encoded trit sequences (as the F2F-encoded signal 619) into the driver 621 to drive (2348) the inductor 628 and serially transmit baud-rate modulated and/or unmodulated trit sequences.

Ideally, after the stream of magnetic pulses is emitted by the inductor 628, the channel decoders 631/632/633 successfully decode the received pulses and the payment transaction is approved. However, if the device 610 receives (2350 "Yes") another indication to output card data within a specified duration (e.g., thirty seconds), the controller 702 determines that the transaction was not approved, since the device user is indicating to try again. The controller 702 stores (2352) that the selected framework did not work at the location and/or POS terminal type (updating the framework's weighted score(s)). The controller 702 may also store details regarding the baud rate modulation(s) and pattern of n-state trits that were used.

If another framework remains in the sorted list (2354 "Yes"), the controller 702 selects (2360) the next framework and repeats the process. In the alternative, the controller 702 may reuse the existing framework, and instead alter the baud rate modulations and/or the pattern of inserted n-state trits.

If the contactless payment device 610 runs out of frameworks to try (2354 "No") before the user loses patience and gives up, there are several options available, depending upon stored rules. For example, controller 702 may retry a framework at the top of the sorted list, but using different baud rates, baud rate modulations, and n-state trit sequences. As another example, if there is wireless network connectivity, the controller 702 may request (2356) additional sequence frameworks from a remote server. As a last resort, the contactless payment device 610 may output an error indication for the benefit of the device's user.

If the device 610 does not receive (2350 "No") another indication to output a card payment pulse sequence within a specified duration (e.g., thirty seconds), the assumption is made that the transaction was approved. The controller 702 stores (2370) that the framework did work at the location and/or with the identified POS terminal type (updating the framework's weighted score). The controller 702 may also store details regarding the baud rate modulation and pattern of n-state trits that were used. The time and date of the transaction may also be logged by the device 610, so as to allow a later comparison of the transaction with transactions approved by a transaction processor, so as to validate the improved confidence value (i.e., the weighted score) associated with the framework.

FIG. 24 is an example of how the controller 702 determines a variable baud rate modulation (2344) to use with a trit sequence expressing track data. Frameworks specify at least two track sequences (e.g., T2-T1, T2-T1R, T1N-T2, T1-T2R, etc.), but may specify more (e.g., T1N-T2-T1R, T2-T1N-T2R, T2-T1R-T2R, etc.). A framework may specify plural track sequences to transmit data corresponding to a same card track, such as T1N and T1R in T1N-T2-T1R, and T2 and T2R in T2-T1R-T2R.

The illustrated process may be used by the controller 702 to determine (2344) baud rate modulation for a first trit sequence in a framework that specifies at least two track sequences, such as T2-T1, T2-T1R, T1N-T2, T1-T2R, T1N-T2-T1R, T2-T1N-T2R, or T2-T1R-T2R. However, this process may also be used to determine a variable baud rate for any sequence of track data prior to the last track's trit sequence. The example in FIG. 24 is for a framework that includes sequences for two different track channels.

The controller 702 identifies (2410) at least one subsequent sequence "B" that is different from the first sequence "A", where A and B are directed to different MSR channels. For example, in a T2-T1R framework, the first trit sequence T2 will comprise Track 2 102 data in forward bit-order, and the second trit sequence T1R will comprise Track 1 101 data in reverse bit-order. As another example, with a T1N-T2-T1R framework, the first trit sequence T1N will be based on the Track 1 format, and the second trit sequence T2 will be comprise Track 2 102 data in forward bit-order. In comparison, the T1R Track 1 reverse bit sequence in T1N-T2-T1R is directed to the same channel as T1N, and is included for redundancy in case the Track 1 channel decoder 691 does not detect or recognize T1N as a valid sequence.

The controller 702 determines (2412) the card-present timeout thresholds $TO_A$ and $TO_B$ for the first and second channel track sequences, as discussed with FIG. 12. This may have previously been determined by the controller 702 as part of sorting (2330) the track frameworks when giving priority to frameworks that arrange the track data for the channel with the shorter timeout threshold before the data for a track channel with a longer timeout threshold.

The controller 702 may calculate the amount of time taken to transmit a non-zero integer number of single characters for a channel to estimate the channel's card-present timeout threshold. The controller 702 determines (2414) rate-of-change limits $\Delta_{UA}$ and $\Delta_{DA}$ for the first channel and $\Delta_{UB}$ and $\Delta_{DB}$ for the second channel if available, as discussed with FIGS. 20 and 21 (e.g., specified in the selected framework, identified in a table or database). The controller 702 also determines (2416) estimated decoder filter bandpass limits $F_{LA}$ and $F_{HA}$ for the first channel, and $F_{LB}$ and $F_{HB}$ for the second channel if available, as discussed in connection with FIGS. 15 and 16 (e.g., specified in the selected framework, identified in a table or database).

How the controller 702 determines each of the parameters in 2412, 2414, and 2416 is independent of the other parameters. One-or-more of the parameters may be included in the selected framework, the parameters may be looked up in a table or database stored on the device 610, or estimated from the available information. Look-ups in table(s) may be based on one-or-more of the most likely POS terminal-types for the geographic location (as determined at 2314), the type of terminal identified by location or image processing (as determined at 2314 or 2324), or based on terminal types specified in or associated with the selected framework (as selected at 2332).

As discussed above, the controller 702 may estimate the timeout limits $TO_A$ and $TO_B$ based on the longest duration of time to transmit a single character in the respective character format times a non-zero integer value, which can be approximated as the number of bits per character (114) divided by the slowest baud rate accepted by the channel's decoder 631/632/633 times the integer. A margin value (e.g., +10%) may be added to increase the likelihood of triggering a timeout. Another approach the controller 702 may use to estimate the timeout limits $TO_A$ and $TO_B$ is based the average amount of time to transmit an entire track of stripe 11 data, divided by the information content 115 of the B channel track, and multiplied by the integer value, plus some margin-for-error (e.g., +10%).

The controller 702 determines (2420) whether the magnitude of the channel B rate-of-change limit $\Delta_{UB}$ for increasing the transmission rate is greater than the magnitude of the channel A rate-of-change limit $\Delta_{UA}$. If it is (2420 "Yes"), the magnitude of the peak slope $\Delta_{Uout}$ for increasing the baud while transmitting the second (channel B) trit sequence is set (2422) to be less than $\Delta_{UB}$ and greater than $\Delta_{UA}$. For example, $\Delta_{Uout}$ can be set to $(|\Delta_{UA}+\Delta_{UB}|)/2$, such that $\Delta_{Uout}$ will be the average of $\Delta_{UA}+\Delta_{UB}$. Otherwise (2420 "No"), the peak slope $\Delta_{Uout}$ for increasing the baud while transmitting the second trit sequence is set (2424) to be less than $\Delta_{UA}$ and less than $\Delta_{UB}$, such as setting $\Delta_{Uout}$ to be 75% of $\Delta_{UB}$.

The controller 702 may also determine (2430) whether the magnitude of the channel B rate-of-change limit $\Delta_{DB}$ for decreasing the transmission rate is greater than the magnitude of the channel A rate-of-change limit $\Delta_{DA}$. If it is (2430 "Yes"), the magnitude of the peak slope $\Delta_{Dout}$ for decreasing the baud while transmitting the second trit sequence is set (2432) to be less than $\Delta_{DB}$ and greater than $\Delta_{DA}$. For example, $\Delta_{Dout}$ can be set to $(\Delta_{DA}+\Delta_{DB})/2$, such that $\Delta_{Dout}$ will be the average of $\Delta_{DA}+\Delta_{DB}$. Otherwise (2430 "No"), the peak slope $\Delta_{Dout}$ for decreasing the baud while transmitting the second trit sequence is set (2434) to be less than $\Delta_D$A and less than $\Delta_{DB}$, such as setting $\Delta_{Dout}$ to be 75% of $|\Delta_{DB}|$.

The controller 702 sets (2440) the baud modulation to start at a first baud that is greater than the channel A and B low frequency filter cutoff-threshold limits $F_{LA}$ and $F_{LB}$, and less than the high frequency filter cutoff-thresholds limits $F_{HA}$ and $F_{HB}$. For example, the effective clock frequency 1701 may be set to produce a first baud that is an average of $F_{LA}$, $F_{LB}$, $F_{HA}$, and $F_{HB}$, thus making the first baud compatible with both the A and B channel decoders.

The controller 702 determines (2450) whether the channel B high frequency filter limit $F_{HB}$ is greater than the corresponding limit $F_{HA}$ of channel A. If it is (2450 "Yes"), a second baud is set (2452) to be greater than $F_{HA}$ and less than $F_{HB}$, such as by averaging $F_{HA}$ and $F_{HB}$. The baud modulation for transmission of the second "B" sequence is set (2460) to increase from the first to the second baud with a peak rate of change (slope) of $\Delta_{Uout}$. The modulation is then set (2464) to maintain the second baud for a period of at least $TO_A$. Thereafter, the modulation is set (2466) to decrease from the second baud back to the first baud, with a peak rate of change (slope) of $-\Delta_{Dout}$.

The controller 702 may use a linear increase at the rates $\Delta_{Uout}$ and $-\Delta_{Dout}$ to transition from the first baud to the second baud, and from the second baud to the first baud, or execute a curve fitting algorithm. For example, to rise gradually transition from the first baud to the second baud, the controller 702 may execute a curve fitting algorithm to produce a gradual increase from the first baud to a mid-baud line segment with slope $\Delta_{Uout}$, and may reuse (rotate) the resulting curve values to produce the increase from the line segment to the second baud. Likewise, to rise gradually decrease from the second baud to the first baud, the controller 702 may execute a curve fitting algorithm to produce a gradual decrease from the second baud to a mid-baud line segment with slope $-\Delta_{Dout}$, and may reuse (rotate) the resulting curve values to produce the gradual decrease from the line segment to the first baud.

If the controller 702 determines (2450 "No") that the channel B high frequency filter limit $F_{HB}$ is not greater than the corresponding limit $F_{HA}$ of channel A, the controller 702 determines (2454) whether the channel B low frequency filter limit $F_{LB}$ is less than the corresponding limit $F_{LA}$ of channel A. If it is (2454 "Yes"), the second baud is set (2456) to be less than $F_{LA}$ and greater than $F_{LB}$, such as by averaging $F_{LA}$ and $F_{LB}$. The baud modulation is set (2462) to decrease from the first to the second baud with a peak rate of change (slope) of $-\Delta_{Dout}$. The modulation is set (2464) to maintain the second baud for a period of at least $TO_A$. Thereafter, the modulation is set (2470) to increase from the second baud back to the first baud, with a peak rate of change (slope) of $\Delta_{Uout}$. As discussed above, the controller 702 may linearly decrease (2462) and increase (2470) the baud, or may execute a curve fitting algorithm to gradually decrease (2462) and increase (2470) the baud. The modulations values/curves are used by the controller 702 to produce and control the effective clock rate 1701.

If the controller 702 determines (2454 "No") that the channel B low frequency filter limit $F_{LB}$ is not less than the corresponding limit $F_{LA}$ of channel A, the second baud is set (2458) to be greater than $F_{LA}$, greater than $F_{LB}$, less than $F_{HA}$, less $F_{HB}$, and greater than the first baud, such as by adding 75% of the difference between the value used for the first baud frequency and $F_{HB}$ to the first baud to produce the second baud. The baud modulation is set (2460) to increase from the first to the second baud with a peak rate of change (slope) of $\Delta_{Uout}$. Thereafter, the modulation is set (2466) to decrease from the second baud back to the first baud, with a peak rate of change (slope) of $-\Delta_{Dout}$. As discussed above, the controller 702 may linearly increase (2460) and decrease (2466) the baud, or may execute a curve fitting algorithm to gradually increase (2460) and decrease (2466) the baud. The modulations values/curves are used by the controller 702 to produce and control the effective clock rate 1701.

In the circumstances that $\Delta_{UB}$ is not greater than $\Delta_{UA}$ (2420 "No"), $|\Delta_{DB}|$ is not greater than $|\Delta_{DA}|$ (2430 "No"), $F_{HB}$ is not greater than $F_{HA}$ (2450 "No"), and $F_{LB}$ is not less than $F_{LA}$ (2454 "No"), but $TO_B$ is longer than $TO_A$, the channel B data can made more susceptible to rejection by the channel A decoder by increasing the modulation after transmission of the A data to be greater than $F_{HA}$ and $F_HB$ for a duration between $TO_A$ and $TO_B$. During this period when the effective clock frequency 1711 is greater than $F_{LA}$ and $F_{LB}$, the channel filters will substantially attenuate (cut off) the signals output by the channel A and B read heads, producing a similar effect to including a continuous series of n-state trits with a duration between $TO_A$ and $TO_B$.

To use such an approach, the controller 702 divides the second trit sequence into two portions, and increases the baud rate therebetween to exceed both $F_H A$ and $F_{HB}$ for a period longer than $TO_A$ and shorter than $TO_B$, such as for a duration that is the average of $TO_A$ and $TO_B$. This approach may also be used when a framework calls for trit sequences for three payment card track channels, such as T3-T1R-T2R, and at least one of the various parameters ($\Delta_U$, $\Delta_D$, $F_L$, $F_H$) distinguishes the first trit sequence from one but not both of the subsequent sequences.

In the alternative, in response to determining that the channel B high frequency filter limit $F_{HB}$ is not greater than the corresponding limit $F_{HA}$ of channel A (2450 "No"), and determining that $F_{LB}$ is not less than $F_{LA}$ (2354 "No"), the process may skip directly to inserting (2346) n-state trits, such as inserting a continuous series of n-state trits after the first trit sequence A for a period longer than $TO_A$ and shorter than $TO_B$, such as for a duration that is the average of $TO_A$ and $TO_B$.

As noted above, a plurality of zeros can serve as clocking bits/trits, preceding and/or following a track trit sequence. The device 610 applies F2F encoding to such zeros in the same manner as the track data and other trits included in the ternary data signal 611. While the transitions between the first and second baud are discussed as being configured to take place during a trit sequence directed to a different channel than the one intended to timeout, a transition between the first and second baud can begin in such clocking bits/trits that precede the trit sequence directed to the different channel. The controller 702 may implement the baud rate modulations by modulating, controlling, and/or generating the clock signal 601 in synchronization with the ternary data signal 611, or by modulating the effective clock 1701 by controlling the duration corresponding to each trit in the ternary data signal 611/1711.

FIG. 25 is an example of how the controller 702 inserts (2346) n-state trits into the trit sequences, after a beginning and before an end of the zero and one trits of the track data trit sequences. The controller 702 determines (2412) the card-present timeout thresholds $TO_A$ and $TO_B$ for the second track sequence channel, as discussed with FIGS. 12 and 24. If the card-present timeout threshold $TO_B$ is greater the card-present timeout $TO_A$ (2520 "Yes"), the controller 702 calculates (2522) a gap duration less than $TO_B$ and greater than $TO_A$, and inserts (2524) a continuous series of n-state trits after the first trit sequence A, either into or prior to the second trit sequence B, to create the gap duration, thereby triggering a timeout of the channel A decoder. An example of how the controller 702 may calculate (2522) the gap duration is by taking the average of $TO_A$ and $TO_B$.

In addition to inserting (2524) the continuous series of n-state trits to trigger the timeout, or if the card-present timeout threshold $TO_B$ is not greater the card-present timeout $TO_A$ (2520 "No"), the controller 702 will insert n-state trits into the ternary data prior to the track B sequence to overflow the track B decoder's buffer, thereby purging some-or-all of the track A data prior to the track B decoder processing received data.

To initiate an overflow of the channel B buffer discussed with FIG. 14, the controller 702 determines (2530) a first amount of time to transmit an entirety of the first trit sequence "A" and any trits between the A and B sequences. If n-state trits were inserted into the ternary data after (at 2524) the first trit sequence "A" and before the trit sequence "B", the time to transmit those n-state trits are included in the first amount of time. The first amount of time may be calculated based on the time to transmit the generated A trit sequence (including any n-state trits inserted between the A and B sequences) at the default baud rate for the "A" channel (or at the baud rate modulation set for "A" sequence at 2344, if "A" is the second sequence specified in the selected framework, and "B" is the third sequence).

The controller 702 also determines (2532) a second amount of time to fill/overflow a FIFO buffer of the target MSR's B channel. This value may be included in the selected framework, or determined based on the identified (2324) terminal type, determined based on a terminal type associated with the geographic location (2314), and/or determined based on a terminal type associated with the selected framework, with the controller 702 cross-referencing the terminal type with tables/database stored on the device 610 to determine the value.

The controller 702 determines (2534) whether the second amount of time is longer than the first amount of time. If the second amount of time is longer (2534 "Yes"), a channel B buffer overflow can be triggered by adding n-state trits to the ternary data prior to the track B data. The controller calculates (2536) the difference between the first and second amounts of time, and inserts n-state trits into the ternary data after the start of the first trit sequence A, prior to the second trit sequence B, with the cumulative time that the additional n-state trits adding or exceeding the calculated (2536) difference. The controller 702 may calculate how many n-state trits to insert based in part on the baud rate that will be applied to the respective n-state trits.

The controller inserts (2538) n-state trits after the start of sequence A, but prior to sequence B, to create a cumulative time gap exceeding the calculated difference. The n-state trits may be interspersed into (FIG. 13) and/or after the Track A data. The controller may determine how the n-state trits should be interspersed based on sets of rules. For example, frameworks such as T1-T2R, T1N-T2-T2R, and T2-T1N-T2R may perform better with an n-state-induced gap between the Track 1 and Track 2 sequences, rather than interspersed within a track data bitstream.

After n-state trits are added (2538), or a determination is made that the second amount of time is not longer than the first amount of time (2534 "No"), additional information may be encoded into the ternary data using the n-state trits for steganography. This additional information may be anything, and may be used to supplement the transaction when received by a compatible MSR 2230. For example, the additional information may include additional security validation information, coupon codes, or a Uniform Resource Locator (URL).

The controller 702 determines (2540) n-state trit patterns to encode the additional information, and arranges (2520) the n-state trits to replicate the patterns, subdividing, combining, and inserting additional n and n/2 trits as necessary. The continuous series of n-state trits inserted (2524/2528) into ternary data to trigger a timeout is left unaltered, but other n-state trit sequences may be redistributed. As an alternative, arranging/inserting (2542) the n-state trits with the patterns can be combined with inserting (2538) n-state trits to trigger a buffer overflow, performed before inserting (2538) n-state trits to trigger the buffer overflow, or performed as an independent process. If the n-state trits creating the patterns are inserted prior to determining (2530) the first amount of time, patterned n-state trits inserted into the A sequence and/or between the A and B sequences also contribute to the first amount of time.

The methods of FIGS. 24 and 25 can be readily adapted to work with frameworks that call for bit sequences for three magnetic stripe track channels, such as T3-T1R-T2R. In such arrangements, the controller 702 may select between the various parameters to distinguish the first track sequence (e.g., T3) from the second and third track sequences (e.g., T1R, T2R) and the second track sequence from the third track sequence. For example at least one of $\Delta_{Uout}$ and $\Delta_{Dout}$ may be used to distinguish the second sequence from the first sequence, and the other of $\Delta_{Uout}$ and $\Delta_{Dout}$ may be used to distinguish the third sequence from the first sequence, and the difference between $TO_1$ 1201 and $TO_2$ 1202 may be used to distinguish the second sequence from the third sequence (e.g., by modulating the baud or injection n-state trits to create a gap triggering a Track 1 timeout after T1R).

In some frameworks, the modulation may be set to increase or decrease from the first baud to the second baud (2460, 2462) without decreasing (2466) or increasing (2470) back to the first baud. For example, in a T1N-T2-T2R framework, where the second trit sequence (T2) and third trit sequence (T2R) will be directed to the same MSR channel, the controller 702 may modulate the baud rate of the second sequence (T2) from the first baud to the second baud (e.g., 2460, 2462), but then maintain the second baud into the third sequence (T2R). This should not affect the chance of reception of the third sequence (T2R) by the Track 2 decoder 632, which in any case, is redundant.

While the frameworks discussed have emphasized communicating trit sequences for different track to their intended channel decoders 631/632/633, a special case of step 2346 is preventing the "T2==T3" conflict when a framework specifies redundant sequences of a single track (e.g., T2-T2R, T2R-T2R, T2-T2). When such a framework is selected (2322), the rules executed by the controller 702 may cause the controller 702 to insert a continuous series of n-state trits into the first trit sequence specified by the framework (e.g., T2 in T2-T2R) in order to trigger a timeout in the other channel's decoder (Track 3 decoder 633). By inserting a continuous series of n-state trits into the first trit sequence (e.g., embedded in the T2 sequence of T2-T2R) that is shorter than the timeout threshold for the first channel ($TO_2$ 1202) but exceeds the timeout threshold for the other channel (i.e., exceeds $TO_3$ 1203), the other channel's decoder (Track 3 decoder 633) will timeout before an entirety of the first channel's data is transmitted, thereby avoiding a T2==T3 conflict. Such rules may cause the controller 702 to execute this approach with any framework where there is a potential for a T2==T3 conflict, particularly if the POS terminal type identified based on geographic location (2312, 2314) or image processing (2322, 2324, 2326) is identified as a three-read-head device, and the selected framework specifies transmission of a trit sequence for Track 2 102 but not Track 3 103.

While injecting an n-state induced gap works to eliminate a T2==T3 conflict with a T2-T2R, T2R-T2R, or T2-T2 framework, other rules may instead be used to address the conflict with a T3-T3R, T3R-T3R, or T3-T3 framework. For example referring to FIGS. 15 and 16, the controller 702 may cause portions or all of the T3 and T3R sequences to be transmitted at a baud rate producing frequencies higher than $F_{H2}$ 1572/1672, but less than $F_{H3}$ 1573/1673, thereby eliminating a T2==T3 conflict.

Figure 26:
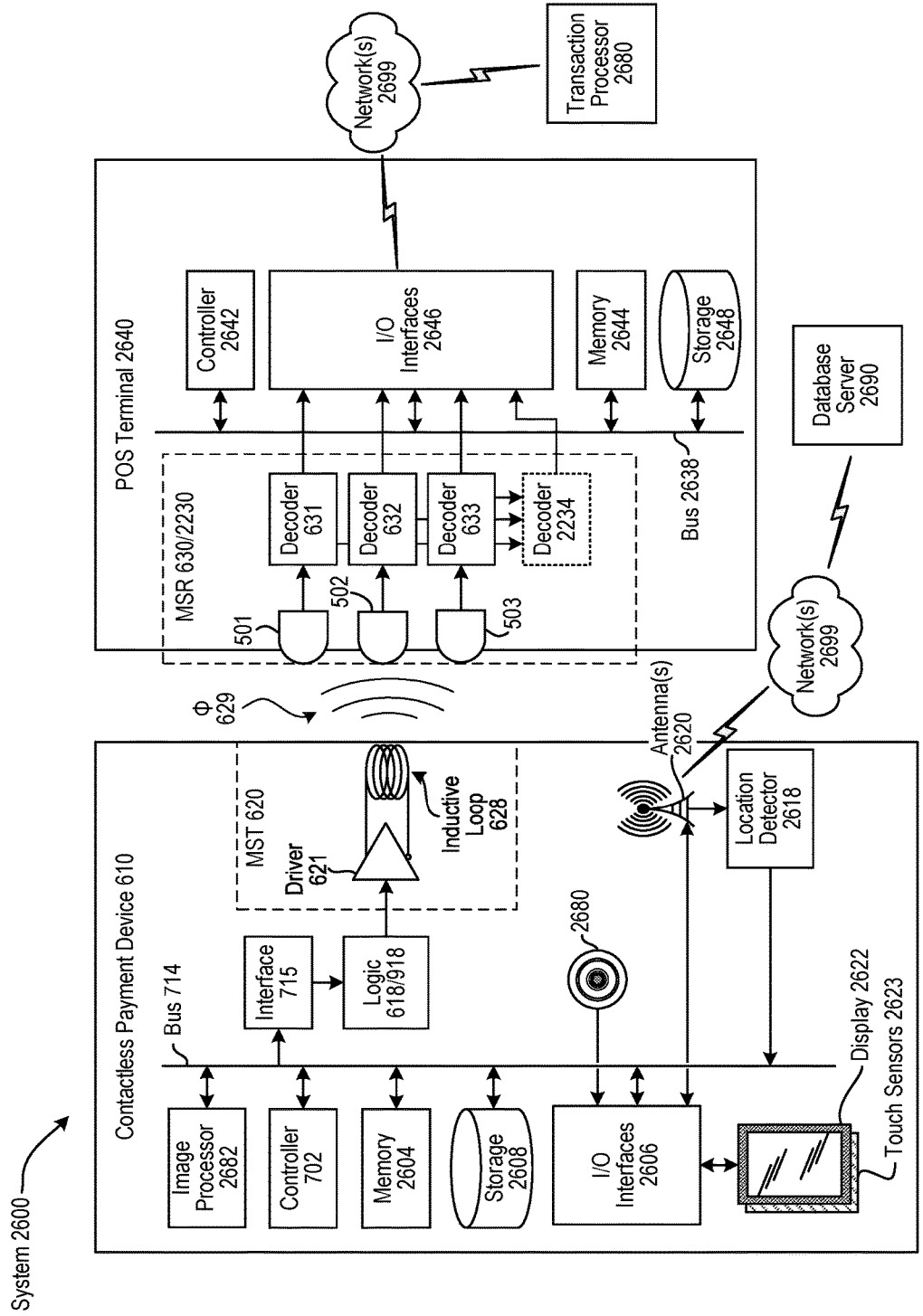
FIG. 26 is a block diagram illustrating example components in a system including the device that transmits and receives ternary-encoded serial pulse sequences, according to the system, process, and apparatus of the disclosure.

FIG. 26 is a block diagram illustrating example components in a system 2600 including the contactless payment device 610 that generates the improved pulse sequence transmission, and a POS terminal 2640 that includes the MSR 630 or 2230.

A controller 702 on the device 610 executes instructions to perform the processes and output the improved pulse sequence transmissions with n-state gaps and variable baud rates discussed in connection with FIGS. 6 to 10 and 12 to 25. This includes arranging the track data and n-states into a ternary data stream 611/1711. This may also include executing instruction to control, generate, and/or down-convert the clock 601/1701 and to perform F2F encoding, if some or all of the logic 618 is integrated into the controller

702. The controller 702 may include a central processing unit (CPU) for processing data and executing instructions.

A memory 2604 stores the instructions that are executed by the controller 702, and the data that is used and generated by those instructions. The memory 2604 may include volatile (transitory) and/or non-volatile (non-transitory) random access memory (RAM) and/or other types of memory. The device 610 also includes a data storage component 2608, for long term storage of the data and the controller-executable instructions and associated data (e.g., frameworks, look-up tables, parameter databases, rules, etc.). The data storage component 2608 comprises a non-volatile (non-transitory) storage, such as read only memory (ROM), flash memory, phase-change memory, Ferroelectric RAM (FeRAM or FRAM), etc. The device 610 may also be connected to removable or external non-volatile memory and/or storage, such as a removable memory card, a USB "thumb" drive, networked "cloud" storage, etc., through input/output (I/O) interfaces 2606.

The controller-executable instructions that configure the device 610 and its various components are executed by the controller or controllers 702, using the memory 2604 as temporary "working" storage at runtime. The controller-executable instructions may be stored in the memory 2604, the storage component 2608, and/or an external device. Some of the instructions may be embedded in hardware or firmware in addition to or instead of software.

The I/O interfaces 2606 may include interfaces for an external peripheral device connection such as universal serial bus (USB), as well as interfaces for wireless local area network (such as WiFi), Bluetooth, and/or cellular network (such as Long Term Evolution (LTE)) connectivity via the antenna(s) 2620. The I/O interfaces 2606 may also provide interfaces to a display 2622 including touch sensors 2624, and to one or more cameras 2680.

The antenna(s) may also be used by a location detector 2618, which may include one or more specialized radio receivers, such as a GPS receiver or GLONASS receiver. Instructions executed by the controller(s) 702 may determine the device's geographic location based on location information determined by the location detector 2618. Location information may be used to identify (2314) POS terminal types and/or frameworks associated with the geographic location to determine which track data is likely to be needed, so as to select (2332) a stream framework (e.g., T2-T1, T2-T1R, T1N-T2, T1-T2R, T1N-T2-T1R, T2-T1N-T2R, T2-T1R-T2R, etc.) based on what has worked successfully at or near that location before.

The device 610 may also include an image processor 2682, either as a component (e.g., a digital signal processor), or as instructions stored in storage 2608 that configure the controller 702 to perform image processing. The image processor 2682 may be used to processes image captured by the one or more cameras 2680 to perform the pattern recognition (2322) to identify (2324) a POS terminal based on distinctive physical features/shape. The controller 702 may select (2332) the framework based on such recognition of the POS terminal.

In addition, the image processor 2682 may be used to identify the proximity and orientation of the POS terminal's MSR 630/2230 based on pattern recognition. Instructions stored in storage 2608 may be used to configure the controller 702 to cause the display of information on the display 2622 instructing a user how to position the device 610 relative to the MSR 530/2230 of the POS terminal 2640 to improve the likelihood that the POS terminal 2640 will correctly receive the magnetic pulse sequence when it is emitted via the inductive loop 628. The instructions may be in the form, for example, of an augmented reality interface that displays the live image of the MSR 630 as captured by the camera 2680 on the display 2622, together with an overlay indicating whether the user should move the device up, down, closer, further, etc. relative to the MSR 630/2230.

The device 610 may include an address/data bus 714 for conveying data among components of the device 610. Each component within the device 610 may also be directly connected to other components in addition to (or instead of) being connected to other components across the bus 714.

A list of pulse transmission sequence stream frameworks may be stored in memory 2604 and/or storage component 2608, and updated/reconciled against data stored on a database server 2690, reached via a connection over one-or-more networks 2699. The controller 702 sequentially sends the serial data stream 611 to the logic circuit 618 in accordance with the selected stream framework, and/or may send the encoded signal 932. In response to receiving the F2F-encoded signal 619, the driver 621 applies a time-modulated alternating current to the inductive loop 628, reducing the current to a reference level (e.g., zero Amperes) in response to the n-state. The application of the alternating current to the loop 628 generates the magnetic pulse transmission.

The example POS terminal 2640 includes the MSR 630 or 2230. As previously discussed, the MSR 630/2230 includes two or three of the read heads 501, 502, and 503. The Track 1 channel read head 501 outputs a signal to a Track 1 channel decoder 631. The Track 2 channel read head 502 outputs a signal to a Track 2 channel decoder 632. The Track 3 channel read head 503 outputs a signal to a Track 3 channel decoder 633. It should be appreciated that other components may be implemented in various configurations in different models by different manufacturers of POS terminals. The MSR 630/2230 may be integrated with the POS terminal 2640, or may be separate. The MSR 630/2230 may communicate with components of the POS terminal 2640 via input/output (IO) interfaces 2646.

The POS terminal 2640 includes a controller 2642 that includes a central processing unit (CPU) for processing data and executing instructions, and a memory 2644 that stores the data and the controller-executable instructions. The memory 2644 may include volatile random access memory (RAM) and/or other types of memory. The POS terminal 2640 also includes a data storage component 2648 that provides long-term storage of the data and the controller-executable instructions. The data storage component 2648 may include one or more non-volatile storage types such as read only memory (ROM), flash memory, a hard disk drive (HDD), etc. The POS terminal 2640 may also be connected to removable or external non-volatile memory and/or storage, such as a USB "thumb" drive, an optical disc drive, networked "cloud" storage, etc., through the IO interfaces 2646.

The controller-executable instructions that configure the POS terminal 2640 and its various components are executed by the controller 2642, using the memory 2644 as temporary "working" storage at runtime. The controller-executable instructions may be stored in the non-volatile memory 2644, the storage component 2648, and/or an external device. Some of the instructions may be embedded in hardware or firmware in addition to or instead of software. Some or all of the functionality of the channel decoders 631, 632, 633 and 2234 may be performed by the controller 2642 instead of or in conjunction with dedicated decoder circuitry within the MSR 630/2230.

The POS terminal 2640 may include an address/data bus 2638 for conveying data among components of the terminal 2640. Each component within the POS terminal 2640 may also be directly connected to other components in addition to (or instead of) being connected to other components across the bus 2638.

The POS terminal 2640 may use an input/output (IO) interface 2646 to communicate with a transaction processor 2680 via network(s) 2699. Instructions executed by the controller 2642 receive the decoded pulse information from the MSR 630/2230, extract the information needed for transaction approval, and forward at least a portion of the extracted information to the transaction processor 2680. The transaction processor 2680 sends back information indicating whether the transaction is approved or denied. The POS terminal 2640 may output an indication of whether the transaction is approved or denied, such as outputting a message via a display (not illustrated), by activating an indicator, by outputting a sound, etc. Additional information 2294 extracted by the decoder 2234 such as coupons codes and/or embedded Uniform Resource Locator (URL) addresses may be utilized by the controller 2642 or transmitted via the network(s) 2699 to other systems.

The example stream frameworks, n-state gaps, and baud modulations disclosed herein are intended to teach the principles of how to create and transmit the improved ternary pulse transmission sequences to one of ordinary skill, rather than to be exhaustive. Many modifications and variations may be apparent to those of skill in the art, such as changing the order of process steps, while still achieving the benefits and advantages of the improved system. For example, while several of the examples focus on the transmission of Track 1 data and Track 2 data, the operational principles apply to the transmission of any data stream that includes data for two or three tracks. Moreover, aspects of the system may be practiced without some or all of the specific details and steps disclosed herein.

The transmitter, method, and system may be used to transmit track data associated with the magnetic stripe data of debit cards, credit cards, or bitstreams from any magnetic stripe medium where different tracks of the stripe have different content and/or formats. Examples of difference between formats includes there being a difference in at least at least one of the standards (e.g., 112) associated with the tracks, the recording densities (e.g. 113) of the tracks, and the character configurations (e.g., 114) of the tracks. The disclosed methods and resulting encoding are particularly useful in systems susceptible to cross-channel leakage. As such, the disclosed methods and ternary encoding may also be adapted for use with electronic cards, such as including a continuous series of n-states in the Track 2 data reproduced by the electronic card to prevent a T2==T3 conflict. A multi-channel magnetic tape system such as a tape recorder is another example where the disclosed invention might be useful, such as for the playing of music with speakers. Other related examples are audio, such as high-fidelity equipment, surround sound (three-dimensional-sound effect), etc.

As used in this disclosure, the term "a" may include one or more items unless specifically stated otherwise. Further, the phrase "based on" is intended to mean "based at least in part on" unless specifically stated otherwise.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A contactless magnetic stripe transmission method, comprising:
    generating a ternary data composed of first, second, and third-state trits, the ternary data including first data and second data expressed as first-state and second-state trits, the ternary data further including a plurality of third-state trits after a beginning and before an end of the first-state and second-state trits expressing the first and second data; and
    driving an inductor to produce at least one transition in emitted magnetic flux to a positive polarity or a negative polarity in response each first-state trit in the ternary data;
    driving the inductor to produce at least one transition in emitted magnetic flux to the positive polarity or the negative polarity in response each second-state trit in the ternary data; and
    driving the inductor to emit no magnetic flux in response to each third-state trit in the ternary data, with emission of no magnetic flux continuing until a next first or second-state trit occurs in the ternary data,
    wherein the first data is associated with a first track of a magnetic stripe, and the second data is associated with a second track of the magnetic stripe card, the first and second tracks being different.

2. The contactless magnetic stripe transmission method of claim 1, wherein generating the ternary data includes inserting at least one third-state trit of the plurality of third-state trits between first-and-second-state trits expressing the first data.

3. The contactless magnetic stripe transmission method of claim 1, wherein generating the ternary data includes inserting at least one third-state trit of the plurality of third-state trits between the first and second data.

4. The contactless magnetic stripe transmission method of claim 1, wherein generating the ternary data further comprises:
    arranging the first data in the ternary data to be before the second data;
    determining a first tolerance for time gaps between transitions in received magnetic flux associated with a channel receiver for the first data;
    determining a second tolerance for time gaps between transitions in received magnetic flux associated with a channel receiver for the second data;
    determining that the first tolerance is shorter than the second tolerance;
    calculating a duration for a gap in the emitted magnetic flux that exceeds the first tolerance but is less than the second tolerance;
    inserting a continuous series of third-state trits in the ternary data to occur after the trits expressing the first data, and prior to an end of the trits expressing the second data, to create the gap having the duration in the emitted magnetic flux, the plurality of third-state trits comprising the continuous series.

5. The contactless magnetic stripe transmission method of claim 4, wherein the continuous series of third-state trits is inserted in the ternary data to occur before the trits expressing the second data.

6. The contactless magnetic stripe transmission method of claim 4, wherein the continuous series of third-state trits is inserted in the ternary data to in the ternary data expressing the second data.

7. The contactless magnetic transmission method of claim 4, wherein:
the determining of the first tolerance comprises estimating the first tolerance based on an amount of time to transmit a single character of the first data via the inductor multiplied by a non-zero integer, and
the determining of the second tolerance comprises estimating the second tolerance based on an amount of time to transmit a single character of the second data via the inductor multiplied by the non-zero integer.

8. The contactless magnetic stripe transmission method of claim 1, wherein generating the ternary data further comprises:
arranging the first data in the ternary data to be before the second data;
determining a first amount of time to transmit an entirety the first data and any trits between the first data and the second data via the inductor;
determining a second amount of time to fill a buffer associated with channel receivers for the second data;
determining that the second amount of time is longer than the first amount of time;
calculating a time difference between the first and second amounts; and
inserting the plurality of third-state trits in the ternary data to occur after a beginning of the trits expressing the first data and prior to the trits expressing the second data, a cumulative amount of time to drive the inductor in response to the plurality of third-state trits exceeding the time difference.

9. The contactless magnetic stripe transmission method of claim 8, wherein at least one third-state trit of the plurality of third-state trits is inserted between first and second-state trits expressing the first data.

10. The contactless magnetic stripe transmission method of claim 1, generating the ternary data includes:
determining a pattern of n-state trits to encode information; and
interspersing at least a portion of the plurality of third-state trits between the first and second-state trits based on the pattern.

11. A contactless magnetic stripe transmission device comprising:
a controller that generates a ternary data composed of first, second, and third-state trits;
a logic circuit and driver that converts the ternary data into a time-variable electric;
an inductor that emits magnetic flux in response to the time-variable electric,
a memory including instructions to be executed by the controller to:
generate the ternary data to include first data and second data expressed as first-state and second-state trits, and to include a plurality of the third-state trits after a beginning and before an end of the first-state and second-state trits expressing the first and second data, the first data is associated with a first track of a magnetic stripe, and the second data is associated with a second track of the magnetic stripe, the first and second tracks being different,
wherein, each first-state trit received by the logic circuit produces at least one transition in the magnetic flux to a positive polarity or a negative polarity,
each second-state trit received by the logic circuit produces at least one transition in the magnetic flux to the positive polarity or the negative polarity, and
each third-state trit causes the inductor to emit no magnetic flux until an occurrence of a next first or second-state trit.

12. The contactless magnetic stripe transmission device of claim 11, wherein the instructions to generate the ternary data include instructions to insert at least one third-state trit of the plurality of third-state trits between first-and-second-state trits expressing the first data.

13. The contactless magnetic stripe transmission device of claim 11, wherein the instructions to generate the ternary data include instructions to insert at least one third-state trit of the plurality of third-state trits between the first and second data.

14. The contactless magnetic stripe transmission device of claim 11, wherein the instructions to generate the ternary data include instructions to:
arrange the first data in the ternary data to be before the second data;
determine a first tolerance for time gaps between transitions in received magnetic flux associated with a channel receiver for the first data;
determine a second tolerance for time gaps between transitions in received magnetic flux associates with a channel receiver for the second data;
determine that the first tolerance is shorter than the second tolerance;
calculate a duration for a gap in the emitted magnetic flux that exceeds the first tolerance but is less than the second tolerance;
insert a continuous series of third-state trits in the ternary data to occur after the trits expressing the first data, and prior to an end of the trits expressing the second data, to create the gap having the duration in the emitted magnetic flux, the plurality of third-state trits comprising the continuous series.

15. The contactless magnetic stripe transmission device of claim 14, wherein the continuous series of third-state trits is inserted in the ternary data to occur before the trits expressing the second data.

16. The contactless magnetic stripe transmission device of claim 14, wherein the continuous series of third-state trits is inserted in the ternary data to in the ternary data expressing the second data.

17. The contactless magnetic stripe transmission device of claim 14, wherein:
the instructions to determine of the first tolerance comprise instructions to estimate the first tolerance based on an amount of time to transmit a single character of the first data via the inductor multiplied by a non-zero integer, and
the instructions to determine of the second tolerance comprise instructions estimate the second tolerance based on an amount of time to transmit a single character of the second data via the inductor multiplied by the non-zero integer.

18. The contactless magnetic stripe transmission device of claim 11, wherein the instructions to generate the ternary data include instructions to:
arrange the first data in the ternary data to be before the second data;
determine a first amount of time to transmit an entirety the first data and any trits between the first data and the second data via the inductor;

determine a second amount of time to fill a buffer associated with channel receivers for the second data;
determine that the second amount of time is longer than the first amount of time;
calculate a time difference between the first and second amounts; and
insert the plurality of third-state trits in the ternary data to occur after a beginning of the trits expressing the first data and prior to the trits expressing the second data, a cumulative amount of time to drive the inductor in response to the plurality of third-state trits exceeding the time difference.

19. The contactless magnetic stripe transmission device of claim 18, wherein at least one third-state trit of the plurality of third-state trits is inserted between first and second-state trits expressing the first data.

20. The contactless magnetic stripe transmission device of claim 11, wherein the instructions to generate the ternary data include instructions to:
determine a pattern of n-state trits to encode information; and
intersperse at least a portion of the plurality of third-state trits between the first and second-state trits based on the pattern.

* * * * *